United States Patent
Ichikawa et al.

(10) Patent No.: US 7,514,849 B2
(45) Date of Patent: Apr. 7, 2009

(54) TWO-DIMENSIONAL MOVING APPARATUS

(75) Inventors: Atsushi Ichikawa, Ibaragi (JP); Masayasu Sato, Saitama (JP)

(73) Assignee: Hoya Corporation, Tokyo (JP)

( * ) Notice: Subject to any disclaimer, the term of this patent is extended or adjusted under 35 U.S.C. 154(b) by 281 days.

(21) Appl. No.: 11/459,682

(22) Filed: Jul. 25, 2006

(65) Prior Publication Data

US 2007/0038316 A1 Feb. 15, 2007

(30) Foreign Application Priority Data

Jul. 26, 2005 (JP) ............................ P2005-215834
Dec. 21, 2005 (JP) ............................ P2005-368600

(51) Int. Cl.
*H01L 41/00* (2006.01)
(52) U.S. Cl. .................. 310/328; 310/323.02
(58) Field of Classification Search ............ 310/323.02, 310/328
See application file for complete search history.

(56) References Cited

U.S. PATENT DOCUMENTS

| | | | | |
|---|---|---|---|---|
| 5,121,025 A | * | 6/1992 | Toda | 310/358 |
| 5,130,599 A | * | 7/1992 | Toda | 310/323.02 |
| 5,900,691 A | * | 5/1999 | Reuter et al. | 310/348 |
| 6,064,140 A | * | 5/2000 | Zumeris | 310/323.02 |
| 6,380,660 B1 | * | 4/2002 | Maeno et al. | 310/323.02 |
| 2005/0090912 A1 | | 4/2005 | Ichikawa et al. | |

FOREIGN PATENT DOCUMENTS

JP    2004-274898    9/2004

* cited by examiner

*Primary Examiner*—Mark Budd
(74) *Attorney, Agent, or Firm*—Greenblum & Bernstein, P.L.C.

(57) ABSTRACT

A piezoelectric oscillator 30 comprises an exterior wall that moves a first urging member urging the exterior wall in a first direction x, and moves a second urging member urging the exterior wall in a second direction y that is perpendicular to the first direction x.

The first urging member is moved in the second direction y on the basis of vibration, and the second urging member is moved in the first direction x on the basis of the vibration.

15 Claims, 17 Drawing Sheets

Fig. 14
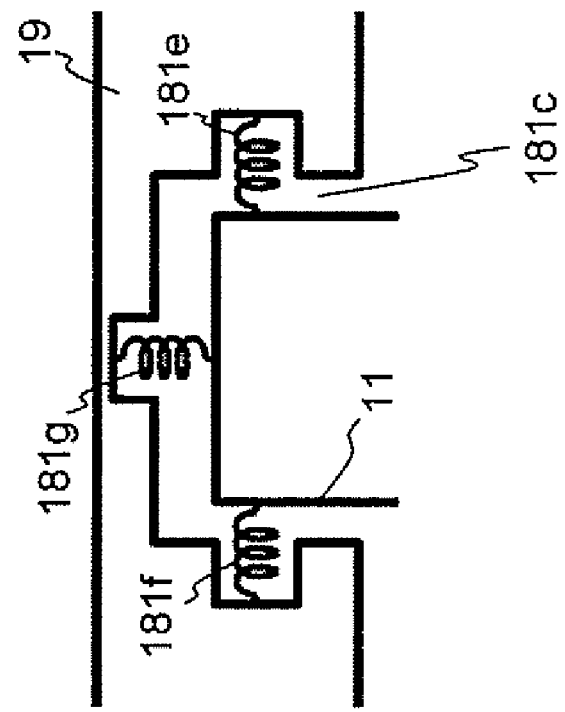
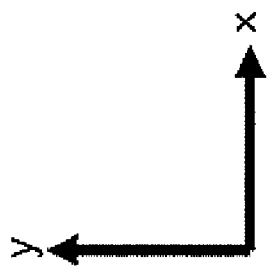

TWO-DIMENSIONAL MOVING APPARATUS

BACKGROUND OF THE INVENTION

1. Field of the Invention

The present invention relates to a moving apparatus, and in particular to a moving apparatus to move a driven apparatus in two-dimensional directions.

2. Description of the Related Art

A moving apparatus that moves a driven apparatus in two-dimensional directions by using a piezoelectric oscillator is proposed.

Japanese unexamined patent publication (KOKAI) No. 2004-274898 discloses a two-dimensional moving apparatus, which has a piezoelectric oscillator that is urged in a direction perpendicular to a movement plane.

However, an urging member that urges the piezoelectric oscillator in the direction that is perpendicular to the movement plane, is arranged. Therefore, the thickness of the moving apparatus in the direction that is perpendicular to the movement plane is increased.

SUMMARY OF THE INVENTION

Therefore, an object of the present invention is to provide a piezoelectric oscillator or a two-dimensional moving apparatus that moves a driven apparatus in the two-dimensional directions, without increasing thickness in the direction that is perpendicular to the movement plane.

According to the present invention, a piezoelectric oscillator comprises an exterior wall that moves a first urging member urging the exterior wall in a first direction, and moves a second urging member urging the exterior wall in a second direction that is perpendicular to the first direction.

The first urging member is moved in the second direction on the basis of vibration, and the second urging member is moved in the first direction on the basis of the vibration.

BRIEF DESCRIPTION OF THE DRAWINGS

The objects and advantages of the present invention will be better understood from the following description, with reference to the accompanying drawings in which:

FIG. 14 is a view along line E-E of FIG. 2, about a part which urges the first friction member, in the third embodiment;

DESCRIPTION OF THE PREFERRED EMBODIMENTS

Figure 1:
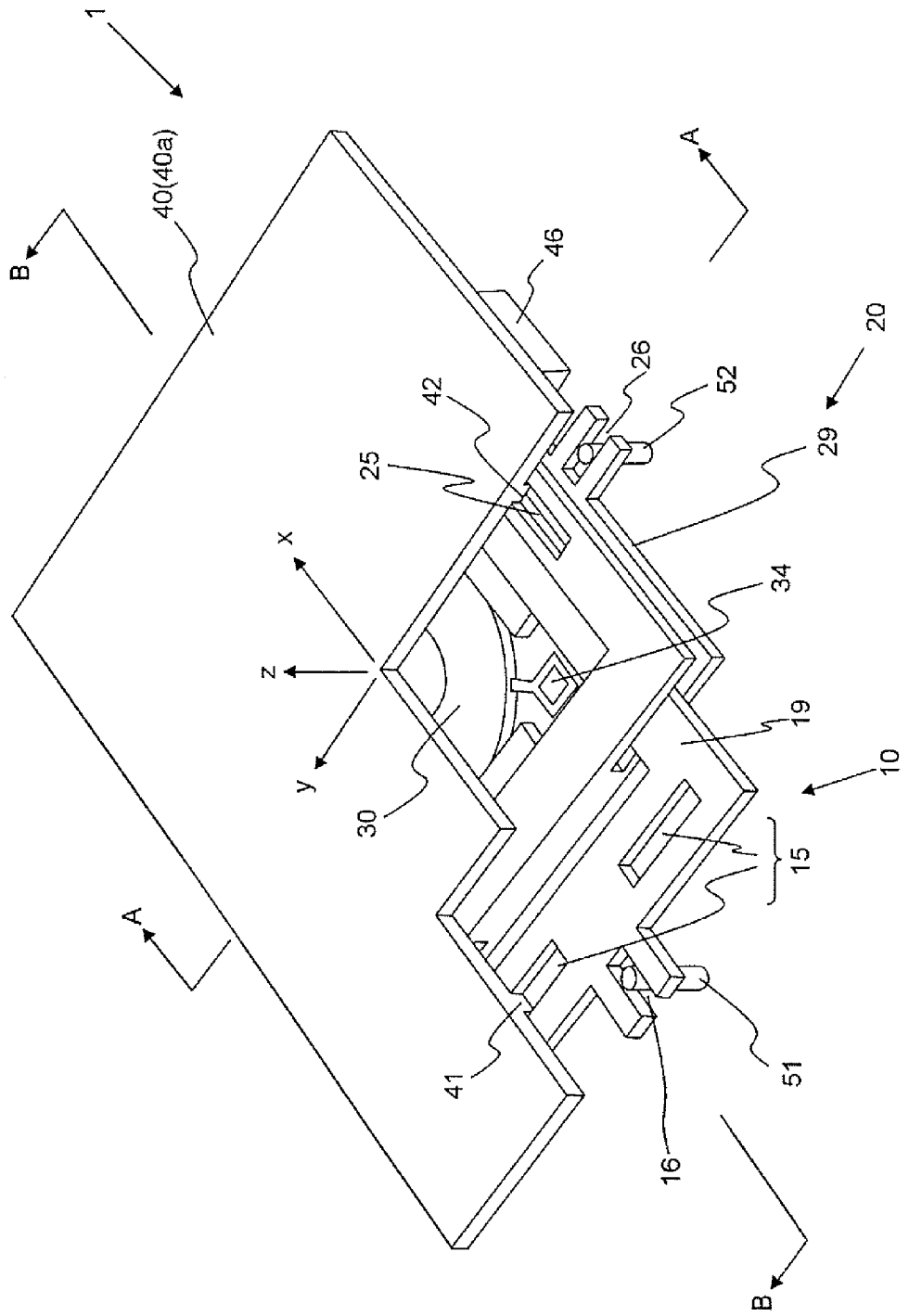
FIG. 1 is a perspective view of a two-dimensional moving apparatus whose loading stand is partly cut away, in the first and second embodiments.
Figure 2:
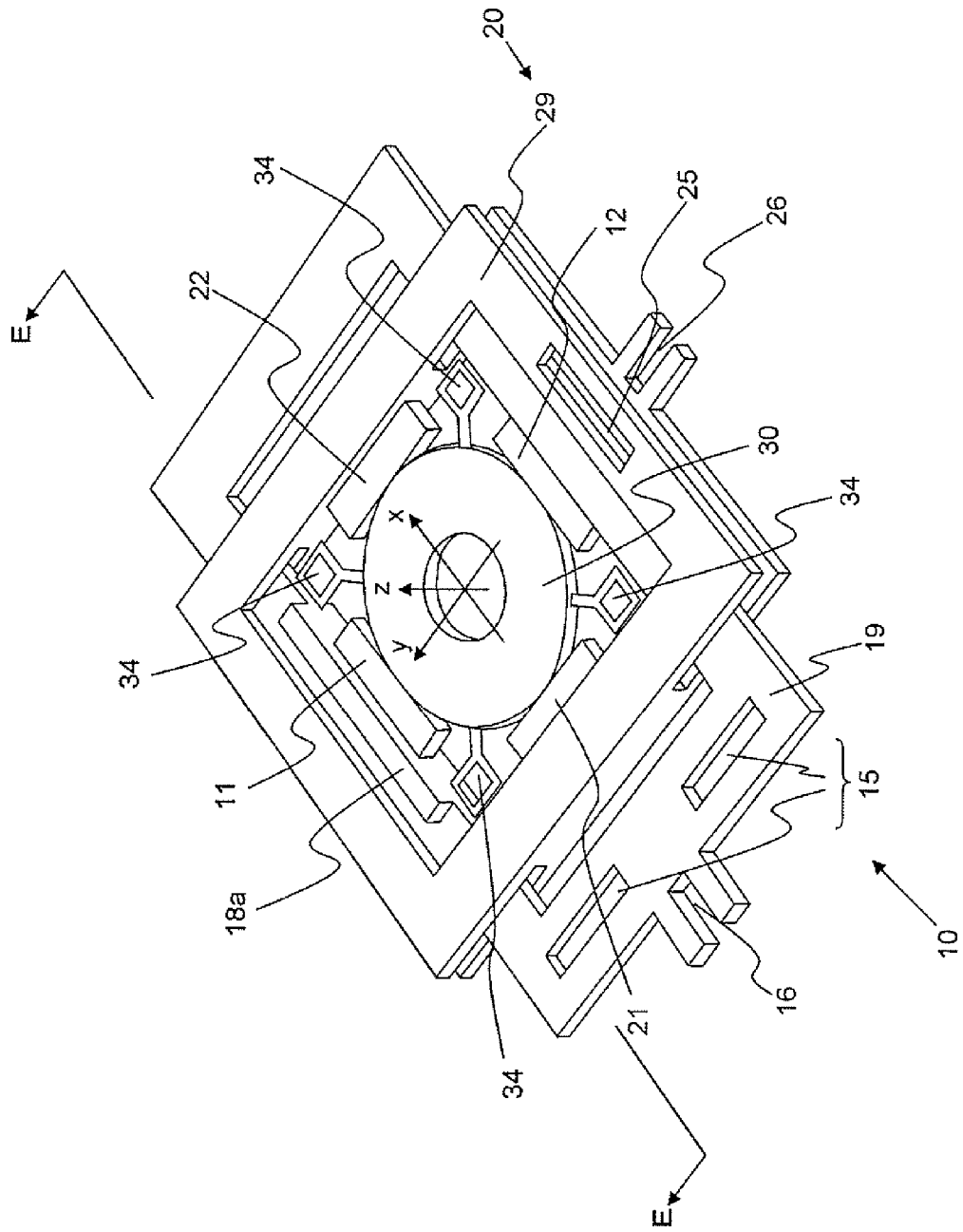
FIG. 2 is a perspective view which shows the horizontal moving unit, the vertical moving unit, and the piezoelectric oscillator.
Figure 3:
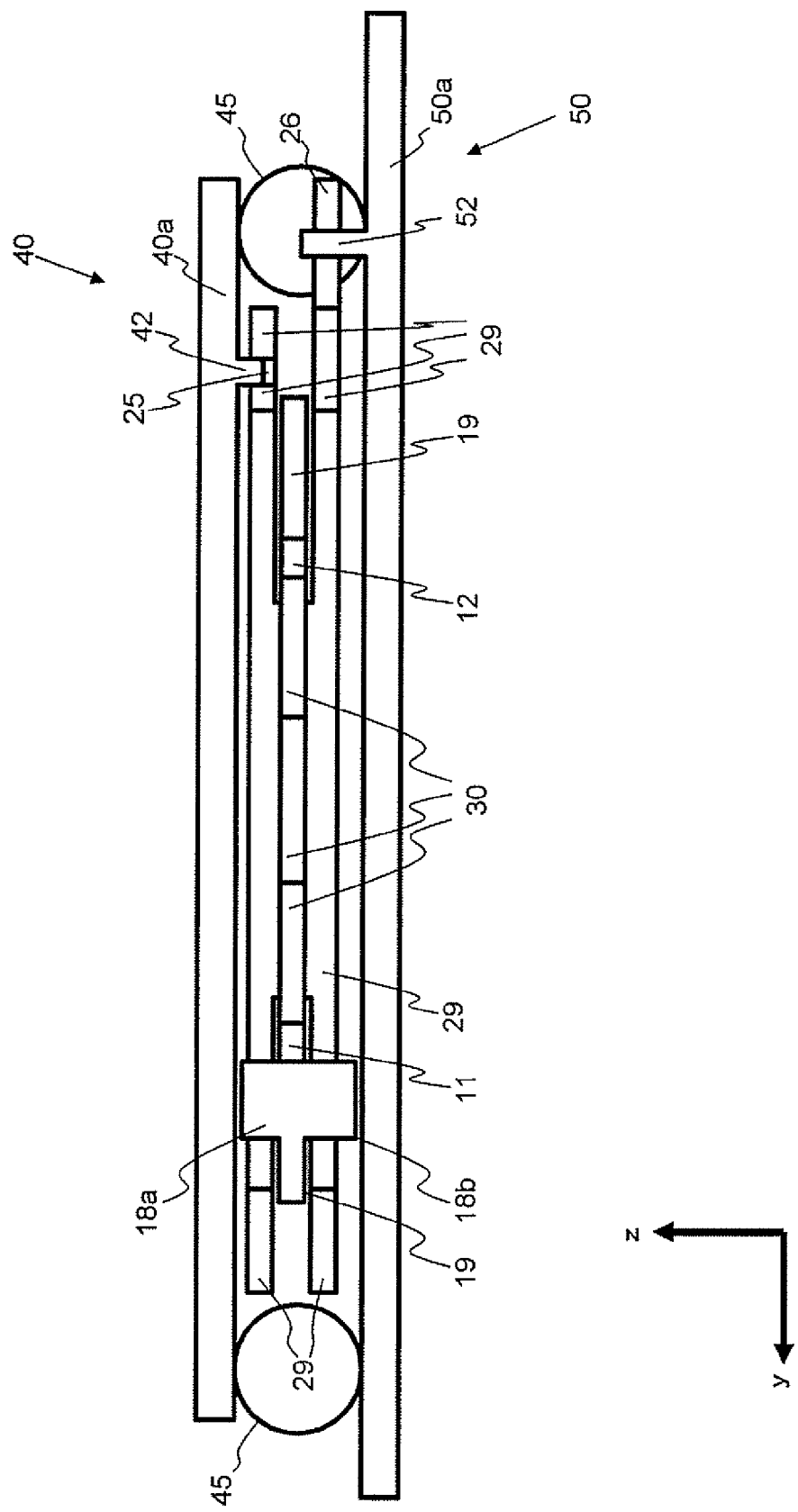
FIG. 3 is a view along line A-A of FIG. 1.
Figure 4:
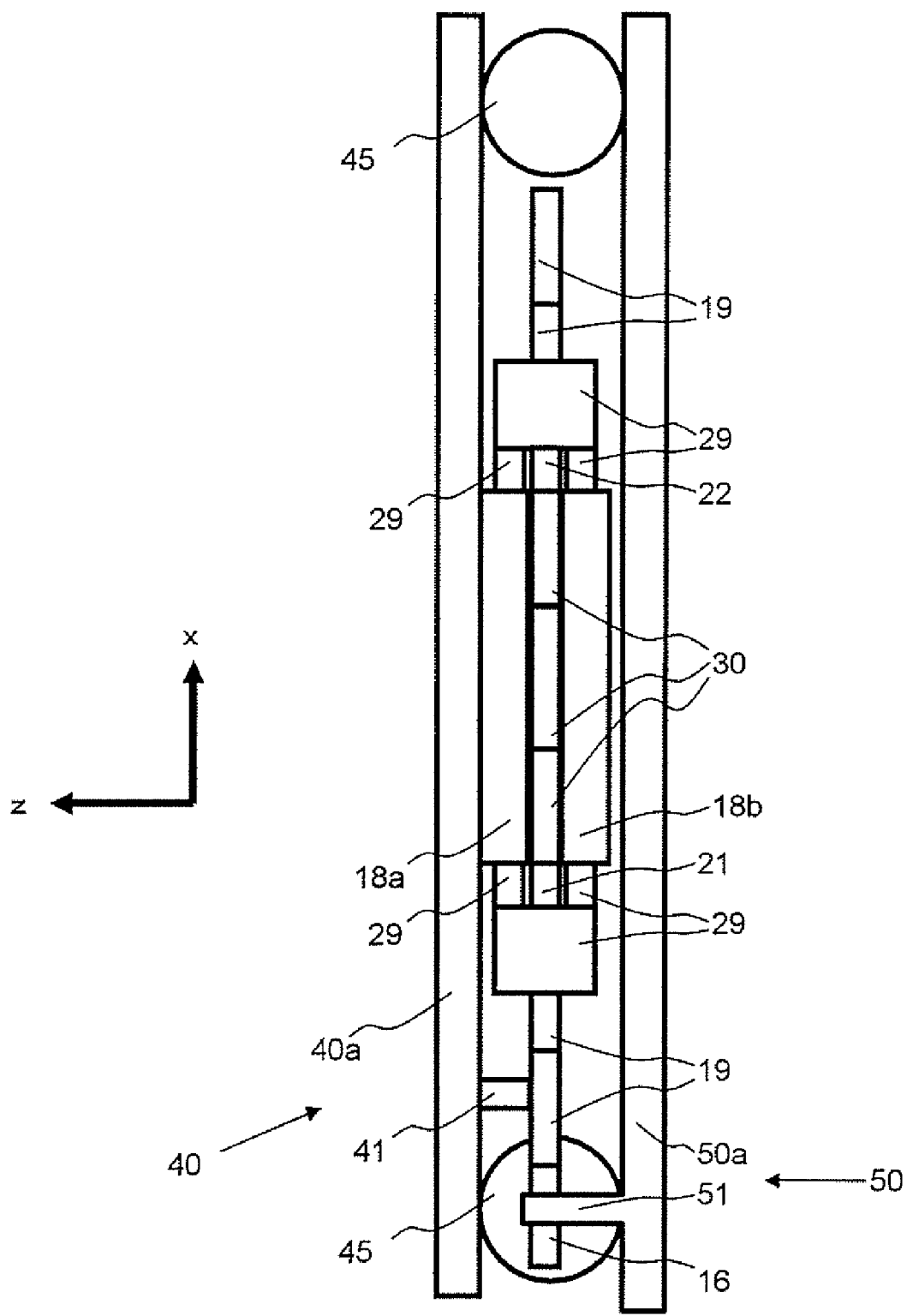
FIG. 4 is a view along line B-B of FIG. 1.

The present invention is described below with reference to the embodiments shown in the drawings. A two-dimensional moving apparatus 1 comprises a horizontal moving unit 10, a vertical moving unit 20, a movable unit that has a loading stand 40, and a fixed unit that has a piezoelectric oscillator 30 and a fixed stand 50 and a circuit unit 70.

In order to explain the directions in this embodiment, a first direction x, a second direction y, and a third direction z are defined (see FIG. 1). The first direction x is a horizontal direction that is a moving direction of the horizontal moving unit 10. The second direction y is a vertical direction that is a moving direction of the vertical moving unit 20 and that is perpendicular to the first direction x. The third direction z is a horizontal direction that is perpendicular to both the first direction x and the second direction y.

The horizontal moving unit 10 has a first friction member 11, a second friction member 12, a first engaging portion 15, a second engaging portion 16, a first overhang portion 18a, a second overhang portion 18b, and a horizontal moving frame 19. The horizontal moving unit 10 can be moved in the first direction x. When the horizontal moving unit 10 is moved in the first direction x, the loading stand 40 links the movement in the first direction x of the horizontal moving unit 10 and moves.

The first friction member 11 forms a rectangular prism. The first friction member 11 has an end 11a at the opposite side of a side that contacts with the piezoelectric oscillator 30 in the second direction y (see FIG. 12). A part of the first friction member 11 that includes the end 11a is inserted in a guide hole 18c of the horizontal moving frame 19.

The first friction member 11 is supported and is urged in the second direction y, so that the first friction member 11 is movable only in the second direction y against the horizontal moving frame 19. One of the planes, which composes the first friction member 11 and which is perpendicular to the second direction y, comes into contact with the piezoelectric oscillator 30. The first friction member 11 is movable with the horizontal moving frame 19 in the first direction x by a vibration of the piezoelectric oscillator 30.

The second friction member 12 forms a rectangular prism. One of the planes, which composes the second friction member 12 and which is perpendicular to the second direction y, comes into contact with the piezoelectric oscillator 30. Another of the planes, which composes the second friction member 12 and which is perpendicular to the second direction y, is fixed inside of the horizontal moving frame 19. The second friction member 12 is movable with the horizontal moving frame 19 in the first direction x by vibration of the piezoelectric oscillator 30.

The first engaging portion 15 has two long holes that stretch in the second direction y. The loading stand 40 has a first projection 41 that has two projections. Each of the two projections of the first projection 41 is slidably engaged to each of two long holes of the first engaging portion 15 in the second direction y (see FIG. 1). Therefore, the horizontal moving unit 10 is not moved in the second direction y in conjunction with the movement of the loading stand 40 in the second direction y, while the loading stand 40 is moved in the second direction y in conjunction with the movement of the vertical moving unit 20 in the second direction y.

The first engaging portion 15 and the first projection 41 are engaged at the two points (holes), so that there is an effect to prevent rotating the loading stand 40 as viewed from the third direction z (in the x-y plane).

The second engaging portion 16 is slidably engaged to a first engaging member 51 of the fixed stand 50 in the first direction x. Therefore, there is an effect to prevent rotating the horizontal moving unit 10 as viewed from the third direction z (in the x-y plane).

Figure 11:
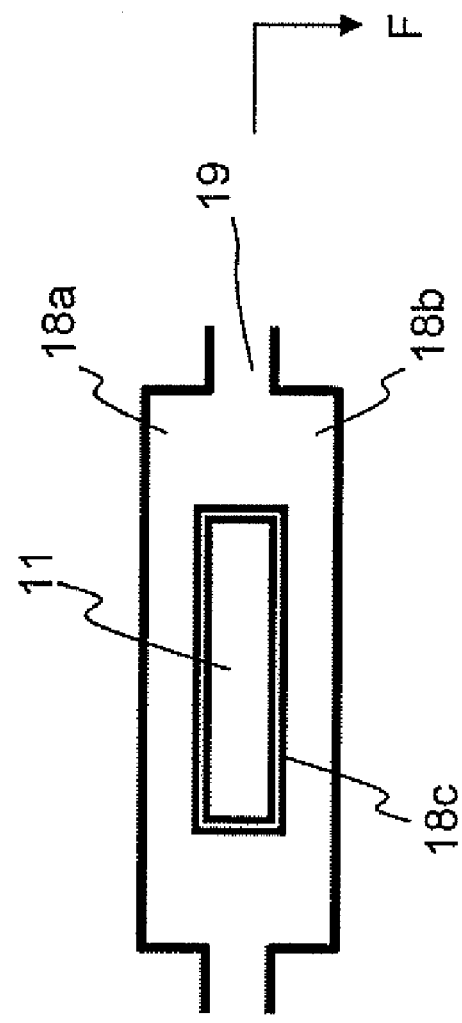
FIG. 11 is a view along line E-E of FIG. 2, about a part that urges the first friction member, in the first embodiment.
Figure 12:
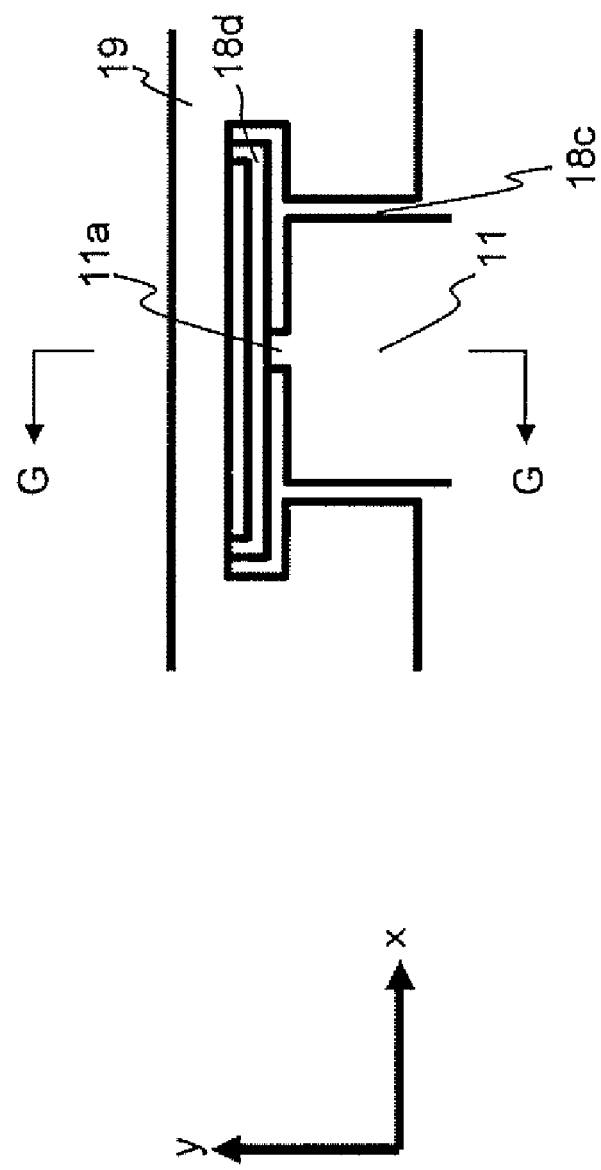
FIG. 12 is a view along line F-F of FIG. 11.
Figure 13:
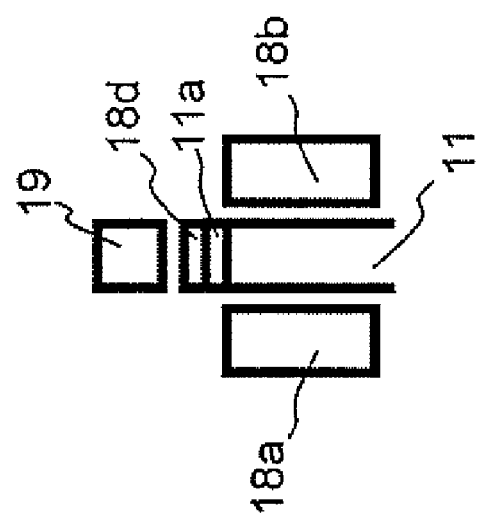
FIG. 13 is a view along line G-G of FIG. 12.

Next, the construction of a part that urges the first friction member 11 in the second direction y and in an inside direction of the horizontal moving frame 19 is explained (see FIGS. 11 to 13).

A part of a side of the first friction member 11 is guided into an inner wall of the guide hole 18c, so that the first friction member 11 is movable in the second direction y and is immobile in the first direction x and in the third direction z. The guide hole 18c is set between the first and second overhang portions 18a and 18b, in the third direction z.

A board-shaped spring 18d, which is an elastic member, is set into the recess of the guide hole 18c. The end 11a of the first friction member 11 is urged in the second direction y and in the same side of the piezoelectric oscillator 30 by the board-shaped spring 18d. The first friction member 11 comes into contact with the guide hole 18c of the horizontal moving frame 19 through the board-shaped spring 18d.

The guide hole 18c, the board-shaped spring 18d, and the end 11a of the first friction member 11 are omitted in FIGS. 1 to 10 for simplification of drawing.

A part of the first friction member 11 that comes into contact with the board-shaped spring 18d (the end 11a) is designed short relative to the board-shaped spring 18d. The urging force by the board-shaped spring 18d remains more constant, while the position where the piezoelectric oscillator 30 comes into contact with the first friction member 11 changes, by making the part coming into contact with the board-shaped spring 18d be designed to be small.

The horizontal moving frame 19 is a flat board-shaped frame having an inwardly-facing rectangle hole that is perpendicular to the third direction z. The first and second friction members 11 and 12 are attached to the inwardly-facing rectangle hole, and the piezoelectric oscillator 30 is arranged between the first and second friction members 11 and 12. The horizontal moving frame 19 contains the guide hole 18c in which a part of the first friction member 11 is inserted.

The vertical moving unit 20 has a third friction member 21, a fourth friction member 22, a third engaging portion 25, a fourth engaging portion 26, and a vertical moving frame 29. The vertical moving unit 20 can be moved in the second direction y. When the vertical moving unit 20 is moved in the second direction y, the loading stand 40 links the movement in the second direction y of the vertical moving unit 20 and moves.

The third friction member 21 forms a rectangular prism. The third friction member 21 has an end at the opposite side of the side that comes into contact with the piezoelectric oscillator 30 in the first direction x. A part of the third friction member 21 that includes the end is inserted into a guide hole of the vertical moving frame 29.

The third friction member 21 is supported and is urged in the first direction x, so that the third friction member 21 is movable only in the first direction x toward the vertical moving frame 29. One of the planes, which composes the third friction member 21 and which is perpendicular to the first direction x, comes into contact with the piezoelectric oscillator 30. The third friction member 21 is movable with the vertical moving frame 29 in the second direction y by the vibration of the piezoelectric oscillator 30.

The fourth friction member 22 forms a rectangular prism. One of the planes, which composes the fourth friction member 22 and which is perpendicular to the first direction x, comes into contact with the piezoelectric oscillator 30. Another of the planes, which composes the fourth friction member 22 and which is perpendicular to the first direction x, is fixed inside the vertical moving frame 29. The fourth friction member 22 is movable with the vertical moving frame 29 in the second direction y by the vibration of the piezoelectric oscillator 30.

The third engaging portion 25 has one long hole that stretches in the first direction x. The loading stand 40 has a second projection 42 that has one projection. The projection of the second projection 42 is slidably engaged to the long hole of the third engaging portion 25 in the first direction x. Therefore, the vertical moving unit 20 is not moved in the first direction x in conjunction with the movement of the loading stand 40 in the first direction x, while the loading stand 40 is moved in the first direction x in conjunction with the movement of the horizontal moving unit 10 in the first direction x.

The fourth engaging portion 26 is slidably engaged to a second engaging member 52 of the fixed stand 50 in the second direction y. Therefore, there is an effect to prevent rotating the vertical moving unit 20 as viewed from the third direction z (in the x-y plane).

The construction of a part that urges the third friction member 21 in the first direction x and in an inside direction of the vertical moving frame 29 is similar to the construction of the part that urges the first friction member 11 in the second direction y and in an inside direction of the horizontal moving frame 19 (not depicted).

A part of a side of the third friction member 21 is guided into an inner wall of the guide hole of the vertical moving frame 29, so that the third friction member 21 is movable in the first direction x and is immobile in the second direction y and in the third direction z.

A board-shaped spring, which is an elastic member, is set into the recess of the guide hole of the vertical moving frame 29. The end of the third friction member 21 is urged in the first direction x and in the same side of the piezoelectric oscillator 30 by the board-shaped spring. The third friction member 21 comes into contact with the guide hole of the vertical moving frame 29 through the board-shaped spring.

A part of the third friction member 21 that comes into contact with the board-shaped spring (the end of the third friction member 21), is designed to be small compared to the board-shaped spring. The urging force by the board-shaped spring remains more constant, while the position where the piezoelectric oscillator 30 comes into contact with the third friction member 21 changes, by making the part coming in contact with the board-shaped spring be designed to be small.

The vertical moving frame 29 is a flat board-shaped frame having an inwardly-facing rectangle hole that is perpendicular to the third direction z. The third and fourth friction members 21 and 22 are attached to the inwardly-facing rectangle hole, and the piezoelectric oscillator 30 is arranged between the third and fourth friction members 21 and 22. The vertical moving frame 29 contains the guide hole in which a part of the third friction member 21 is inserted.

The vertical moving frame 29 has an H-character shape when viewed from the third direction z. Parts of the horizontal moving frame 19 are arranged in channel parts which compose the H-character shape.

The horizontal moving unit 10 is movable in the first direction x without interference from the vertical moving unit 20. The vertical moving unit 20 is movable in the second direction y without interference from the horizontal moving unit 10.

To simplify assembly, it is desirable that the horizontal moving frame 19 not be composed of a unit body construction.

To simplify assembly, it is desirable that the vertical moving frame 29 not be composed of a unit body construction.

Figure 16:
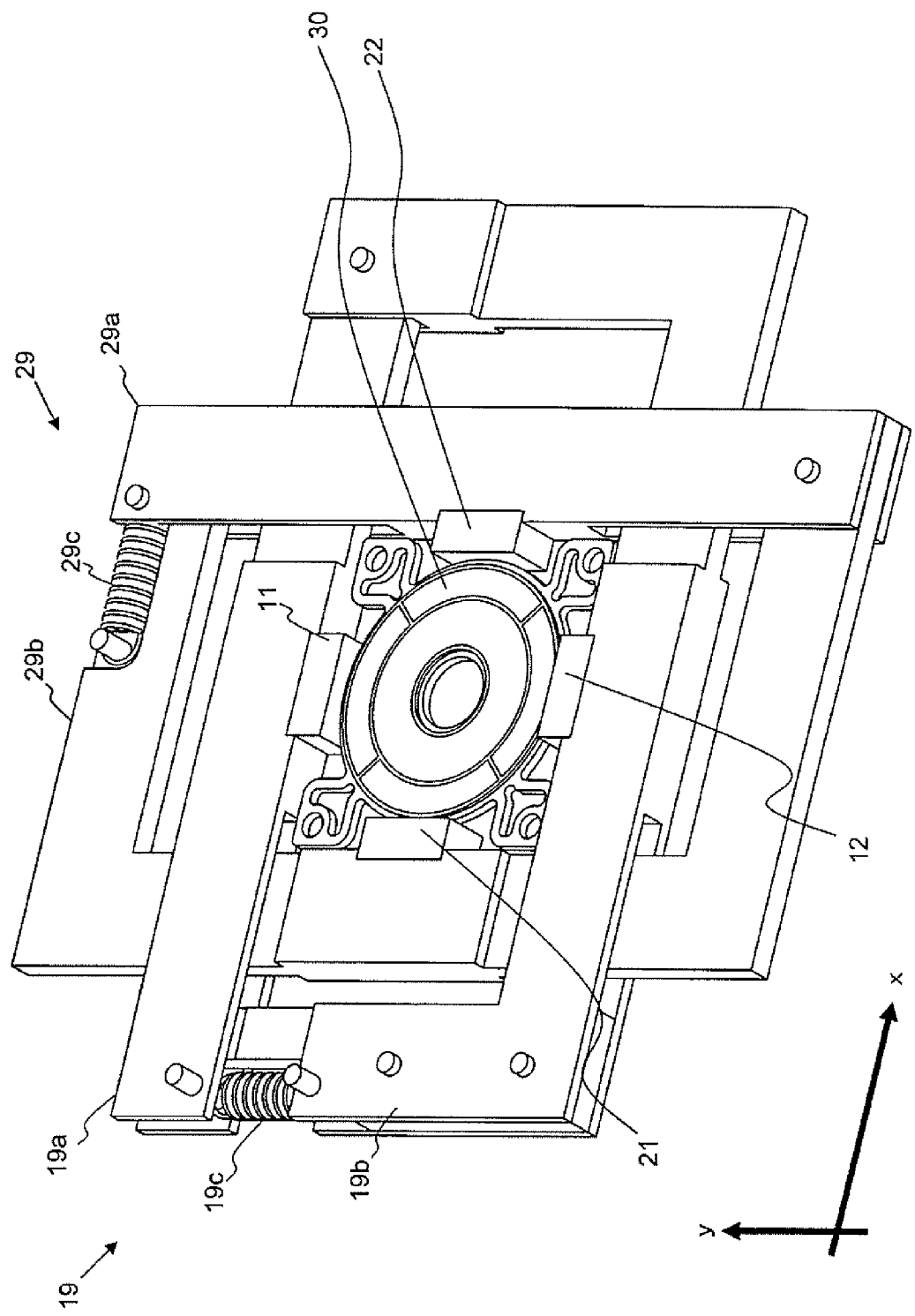
FIG. 16 is a figure showing the construction of the cantilever of the horizontal and vertical moving frames.
Figure 17:
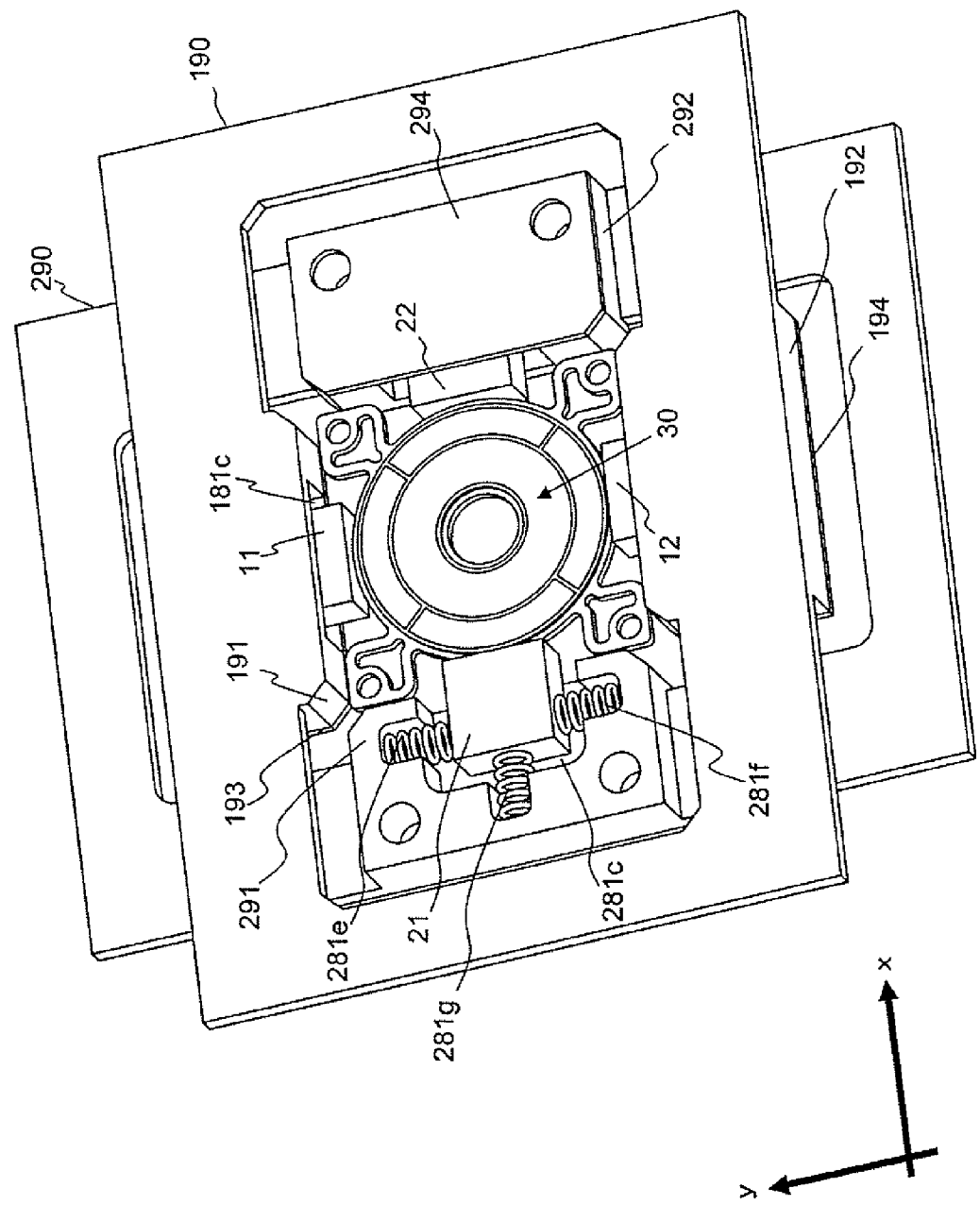
FIG. 17 is a figure showing the construction of the horizontal and vertical moving frames, in the fifth embodiment.

Specifically, the horizontal moving frame 19 is composed of a horizontal moving frame beam 19a, a horizontal moving frame support unit 19b, and a horizontal moving frame coil spring 19c (see FIG. 16).

Similarly, the vertical moving frame 29 is composed of a vertical moving frame beam 29a, a vertical moving frame support unit 29b, and a vertical moving frame coil spring 29c.

One side of the horizontal moving frame beam 19a, which is depicted on the right side in FIG. 16, is supported by the horizontal moving frame support unit 19b, rotatably by means of a pin. Another side of the horizontal moving frame beam 19a, which is depicted on the left side in FIG. 16, is attached to one side of the horizontal moving frame coil spring 19c. Another side of the horizontal moving frame coil spring 19c is attached to the horizontal moving frame support unit 19b. Another side of the horizontal moving frame beam 19a is urged to approach the horizontal moving frame support unit 19b by the helical tension force of the horizontal moving frame coil spring 19c. The first and second friction members 11 and 12 pressurize (urge) the piezoelectric oscillator 30 in the second direction y by urging the horizontal moving frame beam 19a.

One side of the vertical moving frame beam 29a, which is depicted on the lower side in FIG. 16, is supported by the vertical moving frame support unit 29b, rotatably by means of a pin. Another side of the vertical moving frame beam 29a, which is depicted on the upper side in FIG. 16, is attached to one side of the vertical moving frame coil spring 29c. Another side of the vertical moving frame coil spring 29c is attached to the vertical moving frame support unit 29b. Another side of the vertical moving frame beam 29a is urged to approach the vertical moving frame support unit 29b by the helical tension force of the vertical moving frame coil spring 29c. The third and fourth friction members 21 and 22 pressurize (urge) the piezoelectric oscillator 30 in the first direction x by urging the vertical moving frame beam 29a.

FIG. 16 is used for explaining that the horizontal and vertical moving frames 19 and 29 are not composed of a unit body construction. Therefore, the shapes of the horizontal and vertical moving frames 19 and 29 in FIG. 16 are not identical to those in FIG. 2; for example, the vertical moving frame 29 in FIG. 16 does not have the H-character shape.

In FIG. 16, it is explained that the horizontal and vertical moving frames 19 and 29 have a cantilever construction that uses the pin and the coil spring. However, the horizontal and vertical moving frames 19 and 29 may have a construction that uses the coil springs without a pin (not depicted). In this case, both sides of the horizontal moving frame beam 19a are urged by the coil springs, and both sides of the vertical moving frame beam 29a are urged by the coil springs.

The piezoelectric oscillator 30 is composed of a first piezoelectric device (a piezoelectric ceramics ring) 31, a second piezoelectric device (a piezoelectric ceramics ring) 32, and a shim 34. The first and second piezoelectric devices 31 and 32 have a tube (hollow circular cylinder) shape. The shim 34 is composed of a thin metallic elasticity board. The first piezoelectric device 31 is fixed to one side of the shim 34, and the second piezoelectric device 32 is fixed to another side of the shim 34.

Figure 5:
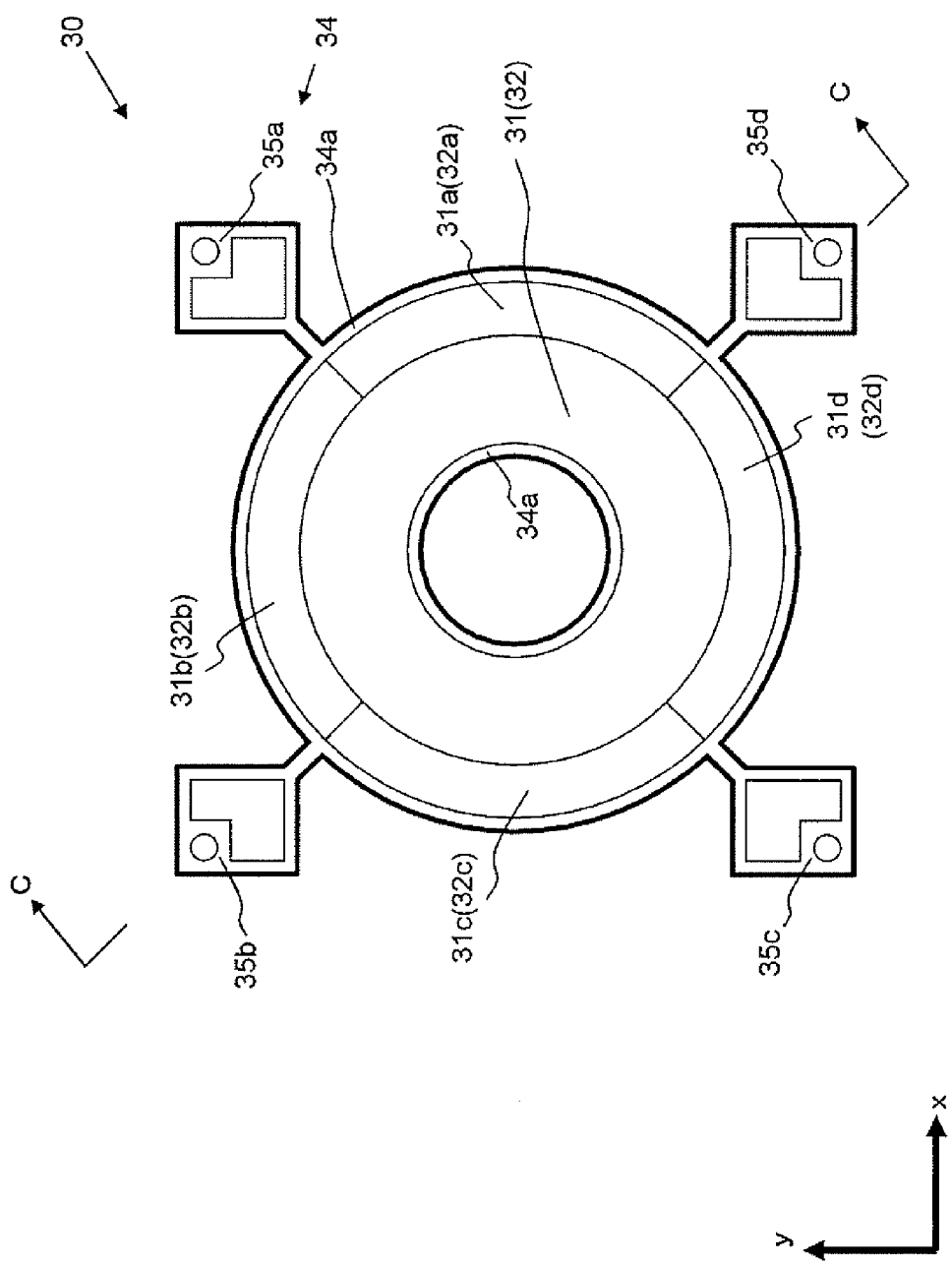
FIG. 5 is a figure showing the construction of the piezoelectric oscillator in the first embodiment.
Figure 6:
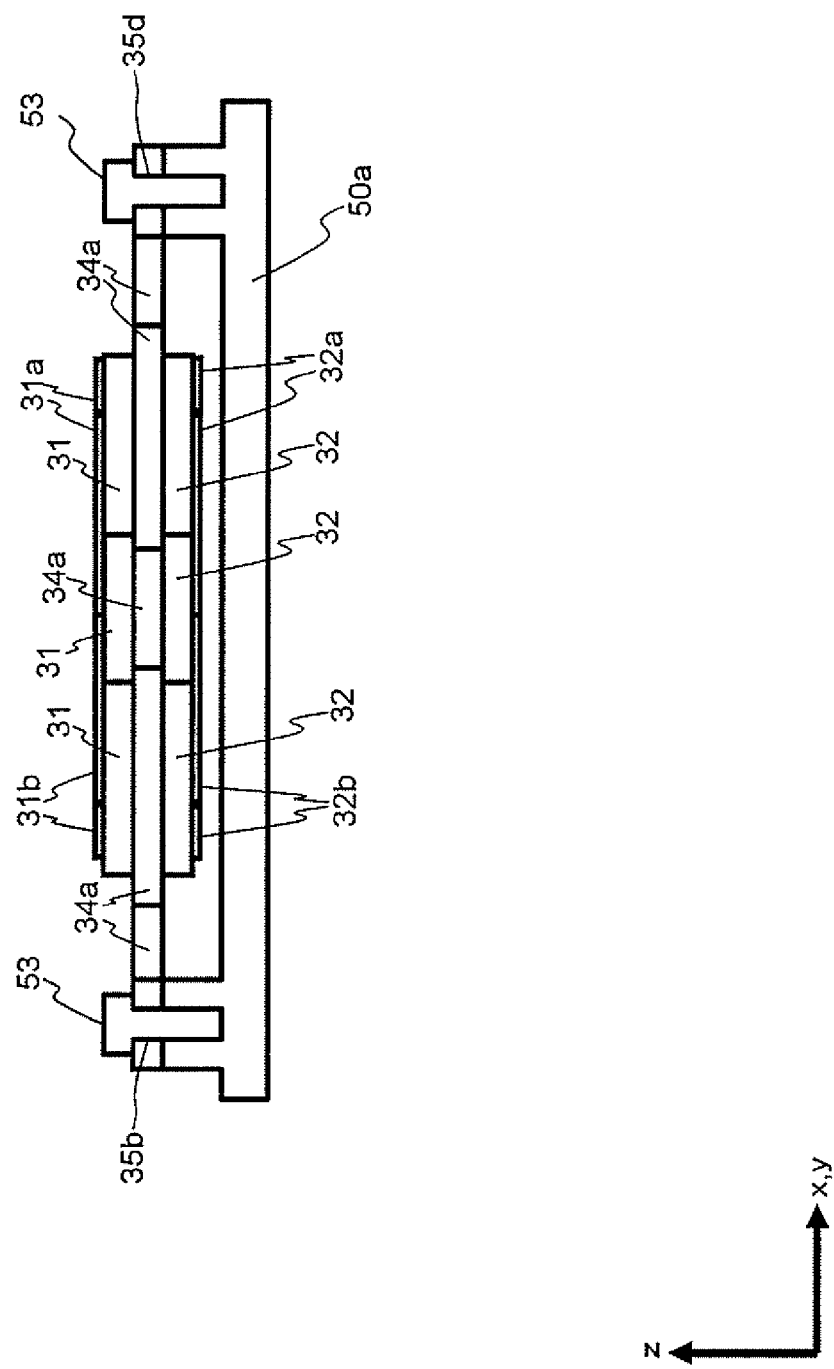
FIG. 6 is a view along line C-C of FIG. 5.

Electrodes are set on the surfaces of the first and second piezoelectric devices 31 and 32 as viewed from the third direction z (see FIG. 5). The electrodes are arranged radially, as viewed from the third direction z. A first electrode 31a, a second electrode 31b, a third electrode 31c, and a fourth electrode 31d are attached to the first piezoelectric device 31. A fifth electrode 32a, a sixth electrode 32b, a seventh electrode 32c, and an eighth electrode 32d are attached to the second piezoelectric device 32.

The electrodes are arranged in order of the first, second, third, and fourth electrodes 31a, 31b, 31c, and 31d, counter-clockwise, as viewed from the third direction z.

The fifth electrode 32a is arranged on the second piezoelectric device 32 so that the first electrode 31a faces the fifth electrode 32a in the third direction z. A first VAC (voltage alternating current), $VE_1$, is applied to the first and fifth electrodes 31a and 32a from the circuit unit 70.

The sixth electrode 32b is arranged on the second piezoelectric device 32 so that the second electrode 31b faces the sixth electrode 32b in the third direction z. A second VAC, $VE_2$, is applied to the second and sixth electrodes 31b and 32b from the circuit unit 70.

The seventh electrode 32c is arranged on the second piezoelectric device 32 so that the third electrode 31c faces the seventh electrode 32c in the third direction z. A third VAC, $VE_3$, is applied to the third and seventh electrodes 31c and 32c from the circuit unit 70.

The eighth electrode 32d is arranged on the second piezoelectric device 32 so that the fourth electrode 31d faces the eighth electrode 32d in the third direction z. A fourth VAC, $VE_4$, is applied to the fourth and eighth electrodes 31d and 32d from the circuit unit 70.

The shim 34 has a shim body 34a, a first support portion 35a, a second support portion 35b, a third support portion 35c, and a fourth support portion 35d.

The first piezoelectric device 31 is mounted on a side surface of the shim body 34a, and the second piezoelectric device 32 is mounted on another side surface of the shim body 34a. The shim body 34a has a tube shape.

The first, second, third, and fourth support portions 35a, 35b, 35c, and 35d are supported by the fixed stand 50.

An exterior wall of the tubular shim body 34a is urged in the second direction y by an urging force of the first friction member 11 and an opposing force of the second friction member 12 against the urging force of the first friction member 11.

The exterior wall of the tubular shim body 34a is urged in the first direction x by an urging force of the third friction member 21 and an opposing force of the fourth friction member 22 against the urging force of the third friction member 21.

The first, second, third, and fourth support portions 35a, 35b, 35c, and 35d are parts that overhang from the shim body 34a. Fixing members 53 are inserted into the holes of the first, second, third, and fourth support portions 35a, 35b, 35c, and 35d, so that the first, second, third, and fourth support portions 35a, 35b, 35c, and 35d are attached to the fixed stand 50.

Therefore, the piezoelectric oscillator 30, including the shim 34, is attached to the fixed stand 50 and does not move. However, the horizontal moving unit 10 and the loading stand 40 are movable in the first direction x by vibration of the piezoelectric oscillator 30, and the vertical moving unit 20 and the loading stand 40 are movable in the second direction y by vibration of the piezoelectric oscillator 30.

When the VAC is not applied to each of the electrodes, the first and second piezoelectric devices 31 and 32 are immobile without transformation.

The part of the piezoelectric oscillator 30 to which the positive voltage is applied expands. The part of the piezoelectric oscillator 30 to which the negative voltage is applied shrinks. For example, when the positive voltage is applied to the first and fifth electrodes 31a and 32a, the part of the first piezoelectric device 31 to which the first electrode 31a is attached expands, and the part of the second piezoelectric device 32 to which the fifth electrode 32a is attached, expands. When the negative voltage is applied to the second and sixth electrodes 31b and 32b, the part of the first piezoelectric device 31 to which the second electrode 31b is attached shrinks, and the part of the second piezoelectric device 32 to which the sixth electrode 32b is attached shrinks.

With the expansion or shrinkage in the x-y plane direction, which is perpendicular to the third direction z, of the first and second piezoelectric devices 31 and 32, the part of the shim 34 that is attached to the first and second piezoelectric devices 31 and 32 expands or shrinks in the x-y plane direction, in the same manner as in which the circle shape viewed from the third direction z transforms.

The VAC is applied to each of the electrodes, so that the piezoelectric oscillator 30, which has the first and second piezoelectric devices 31 and 32, and the shim 34, repeats the expansion and the shrinkage. When the shape of the piezoelectric oscillator 30 transforms as in the above description, an arbitrary point of the exterior wall of the shim body 34a can exhibit elliptical motion.

By this elliptical motion, the first and second friction members 11 and 12 that are in contact with the exterior wall of the shim body 34a while being urged in the second direction y, are moved in the first direction x against the fixed stand 50 and the piezoelectric oscillator 30, so that the horizontal moving unit 10 and the loading stand 40 are moved in the first direction x.

Similarly, by this elliptical motion, the third and fourth friction members 21 and 22 that are in contact with the exterior wall of the shim body 34a while being urged in the first direction x, are moved in the second direction y against the fixed stand 50 and the piezoelectric oscillator 30, so that the vertical moving unit 20 and the loading stand 40 are moved in the second direction y.

The loading stand 40 has a loading stand body 40a, the first projection 41, the second projection 42, and a magnet 46.

The loading stand 40 supports the vertical moving unit 20 slidably in the first direction x, and supports the horizontal moving unit 10 slidably in the second direction y.

The loading stand 40 is movable in the first direction x by the movement of the horizontal moving unit 10, and is movable in the second direction y by the movement of the vertical moving unit 20. Therefore, a member that is attached to the loading stand body 40a can be moved in the x-y plane direction. For example, the member that is attached to the loading stand body 40a is an optical element, such as an image sensor or an anti-shake lens, that is used for the anti-shake operation.

The fixed stand 50 has a fixed stand body 50a, the first engaging member 51, the second engaging member 52, and a fixing member 53. The first engaging member 51 supports the horizontal moving unit 10 slidably in the first direction x. The second engaging member 52 supports the vertical moving unit 20 slidably in the second direction y. The fixing member 53 fixes the piezoelectric oscillator 30. The fixed stand body 50a is a magnetic member.

Balls 45 are arranged between the loading stand body 40a and the fixed stand body 50a. The balls 45 are rotatably rotating ball members that maintain a distance between the loading stand body 40a and the fixed stand body 50a in the third direction z. In the first embodiment, four balls 45 are arranged. The balls 45 are moved with the movement of the loading stand 40 in the x-y plane direction against the fixed stand 50, so that parts of the loading stand body 40a that contact with the balls 45, and parts of the fixed stand body 50a that contact with the balls 45, are set flat.

One side of the magnet 46, which is fixed to the loading stand body 40a, proximally faces the fixed stand body 50a and attracts the fixed stand body 50a. A center of the attracting force of the magnet 46 is set to the inside of a quadrangle that is composed of the four balls 45.

Figure 7:
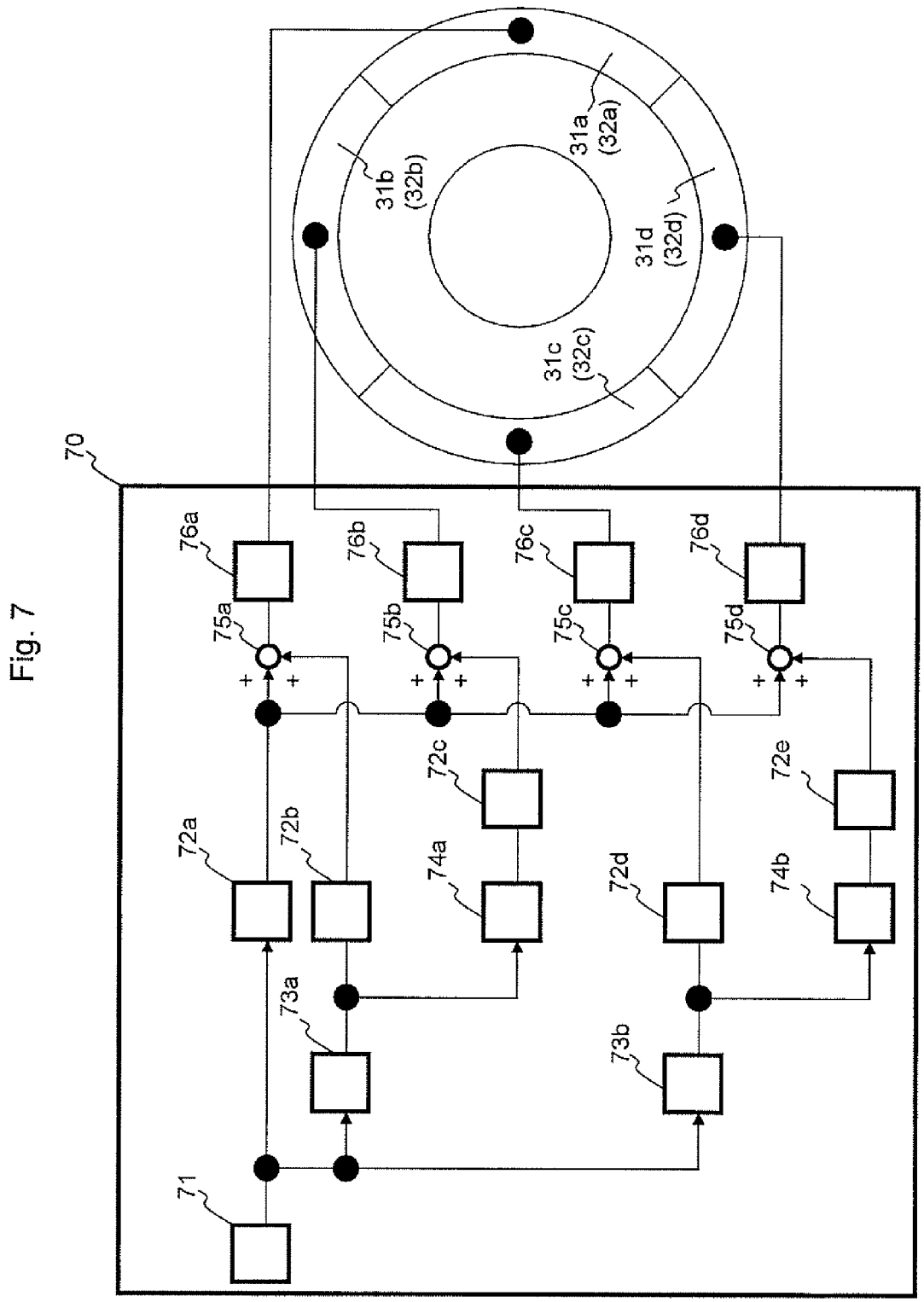
FIG. 7 is a circuit construction diagram in the first embodiment.

The circuit unit 70 has a variable frequency oscillator (function generator) 71, a first amplifier 72a, a second amplifier 72b, a third amplifier 72c, a fourth amplifier 72d, a fifth amplifier 72e, a first phase shifter 73a, a second phase shifter 73b, a first phase splitter 74a, a second phase splitter 74b, a first summing point 75a, a second summing point 75b, a third summing point 75c, a fourth summing point 75d, a first electrical power amplifier 76a, a second electrical power amplifier 76b, a third electrical power amplifier 76c, and a fourth electrical power amplifier 76d (see FIG. 7).

The variable frequency oscillator 71 outputs a sine wave, $V_0 \sin(2\pi ft)$, where $V_0$ is a constant representing the initial amplitude, and f and t are variables representing the frequency and time, respectively. The variable frequency oscillator 71 is connected to the first amplifier 72a, the first phase shifter 73a, and the second phase shifter 73b.

The first amplifier 72a amplifies the input signal $V_0 \sin(2\pi ft)$, and outputs a sine wave, $V_1 \sin(2\pi ft)$, which has a first amplitude $V_1$ and the frequency f. The first amplifier 72a is connected to the first, second, third, and fourth summing points 75a, 75b, 75c, and 75d.

The first phase shifter 73a changes the phase of the input signal, $V_0 \sin(2\pi ft)$, into a first angle $\eta_1$, and outputs a sine wave, $V_0 \sin(2\pi ft+\theta_1)$, which has the initial amplitude $V_0$ and the frequency f. The first phase shifter 73a is connected to the second amplifier 72b and the first phase splitter 74a.

The second phase shifter 73b changes the phase of the input signal, $V_0 \sin(2\pi ft)$, into a second angle $\theta_2$, and outputs a sine wave, $V_0 \sin(2\pi ft+\theta_2)$, which has the initial amplitude $V_0$ and the frequency f. The second phase shifter 73b is connected to the fourth amplifier 72d and the second phase splitter 74b.

The second amplifier 72b amplifies the input signal, $V_0 \sin(2\pi ft+\theta_1)$, and outputs a sine wave, $V_2 \sin(2\pi ft+\theta_1)$, which has a second amplitude $V_2$ and the frequency f. The second amplifier 72b is connected to the first summing point 75a.

The first phase splitter 74a inverts the phase of the input signal, $V_0 \sin(2\pi ft+\theta_1)$, and outputs a sine wave, $-V_0 \sin(2\pi ft+\theta_1)$, which has the initial amplitude $V_0$ and the frequency f. The first phase splitter 74a is connected to the third amplifier 72c.

The third amplifier 72c amplifies the input signal, $-V_0 \sin(2\pi ft+\theta_1)$ and outputs a sine wave, $-V_3 \sin(2\pi ft+\theta_1)$, which has a third amplitude $V_3$ and the frequency f. The third amplifier 72c is connected to the second summing point 75b.

The fourth amplifier 72d amplifies the input signal, $V_0 \sin(2\pi ft+\theta_2)$, and outputs a sine wave, $V_4 \sin(2\pi ft+\theta_2)$, which has a fourth amplitude $V_4$ and the frequency f. The fourth amplifier 72d is connected to the third summing point 75c.

The second phase splitter 74b inverts the phase of the input signal, $V_0 \sin(2\pi ft+\theta_2)$, and outputs a sine wave, $-V_0 \sin(2\pi ft+\theta_2)$, which has the initial amplitude $V_0$ and the frequency f. The second phase splitter 74b is connected to the fifth amplifier 72e.

The fifth amplifier 72e amplifies the input signal, $-V_0 \sin(2\pi ft+\theta_2)$, and outputs a sine wave, $-V_5 \sin(2\pi ft+\theta_2)$, which has a fifth amplitude $V_5$ and the frequency f. The fifth amplifier 72e is connected to the fourth summing point 75d.

The first summing point 75a adds the input signal $V_1 \sin(2\pi ft)$ and the input signal $V_2 \sin(2\pi ft+\theta_1)$, and outputs a sine wave, $V_1 \sin(2\pi ft)+V_2 \sin(2\pi ft+\theta_1)$. The first summing point 75a is connected to the first electrical power amplifier 76a.

The first electrical power amplifier 76a amplifies the input signal, $V_1 \sin(2\pi ft)+V_2 \sin(2\pi ft+\theta_1)$, with an amplification rate $A_1$, and outputs the first VAC, $VE_1: A_1\{V_1 \sin(2\pi ft)+V_2 \sin(2\pi ft+\theta_1)\}$. The first electrical power amplifier 76a is connected to the first electrode 31a and the fifth electrode 32a.

The first VAC, $VE_1$, is applied to the first and fifth electrodes 31a and 32a.

The second summing point 75b adds the input signal $V_1 \sin(2\pi ft)$ and the input signal $-V_3 \sin(2\pi ft+\theta_1)$, and outputs a sine wave, $V_1 \sin(2\pi ft)-V_3 \sin(2\pi ft+\theta_1)$. The second summing point 75b is connected to the second electrical power amplifier 76b.

The second electrical power amplifier 76b amplifies the input signal, $V_1 \sin(2\pi ft)-V_3 \sin(2\pi ft+\theta_1)$, with an amplification rate, $A_2$, and outputs the second VAC, $VE_2: A_2\{V_1 \sin(2\pi ft)-V_3 \sin(2\pi ft+\theta_1)\}$. The second electrical power amplifier 76b is connected to the second electrode 31b and the sixth electrode 32b.

The second VAC, $VE_2$, is applied to the second and sixth electrodes 31b and 32b.

The third summing point 75c adds the input signal $V_1 \sin(2\pi ft)$ and the input signal $V_4 \sin(2\pi ft+\theta_2)$, and outputs a sine wave, $V_1 \sin(2\pi ft)+V_4 \sin(2\pi ft+\theta_2)$. The third summing point 75c is connected to the third electrical power amplifier 76c.

The third electrical power amplifier 76c amplifies the input signal, $V_1 \sin(2\pi ft)+V_4 \sin(2\pi ft+\theta_2)$, with an amplification rate $A_3$, and outputs the third VAC, $VE_3: A_3\{V_1 \sin(2\pi ft)+V_4 \sin(2\pi ft+\theta_2)\}$. The third electrical power amplifier 76c is connected to the third electrode 31c and the seventh electrode 32c.

The third VAC, $VE_3$, is applied to the third and seventh electrodes 31c and 32c.

The fourth summing point 75d adds the input signal $V_1 \sin(2\pi ft)$ and the input signal $-V_5 \sin(2\pi ft+\theta_2)$, and outputs a sine wave, $V_1 \sin(2\pi ft)-V_5 \sin(2\pi ft+\theta_2)$. The fourth summing point 75d is connected to the fourth electrical power amplifier 76d.

The fourth electrical power amplifier 76d amplifies the input signal, $V_1 \sin(2\pi ft)-V_5 \sin(2\pi ft+\theta_2)$, with an amplification rate $A_4$, and outputs the fourth VAC, $VE_4: A_4\{V_1 \sin(2\pi ft)-V_5 \sin(2\pi ft+\theta_2)\}$. The fourth electrical power amplifier 76d is connected to the fourth electrode 31d and the eighth electrode 32d.

The fourth VAC, $VE_4$, is applied to the fourth and eighth electrodes 31d and 32d.

The movement quantity of the horizontal moving unit 10 and other components in the first direction x, and the movement quantity of the vertical moving unit 20 and other components in the second direction y, are adjusted by changing the wave forms (at least either the altitude or the phase of the wave forms) of the first, second, third, and fourth VACs $VE_1$, $VE_2$, $VE_3$, and $VE_4$.

The wave forms of the first, second, third, and fourth VACs $VE_1$, $VE_2$, $VE_3$, and $VE_4$ are modified by changing the values of the frequency f, the first and second angles $\theta_1$ and $\theta_2$, the amplification rates $A_1$, $A_2$, $A_3$, and $A_4$ and other factors in the circuit unit 70.

Next, the second embodiment is explained. In the first embodiment, four electrodes were attached to the first and second piezoelectric devices 31 and 32. However, in the second embodiment, five electrodes are attached to the first and second piezoelectric devices 31 and 32. Therefore, the construction of the circuit in the second embodiment is different from that in the first embodiment. The differences from the first embodiment are outlined as follows.

Figure 8:
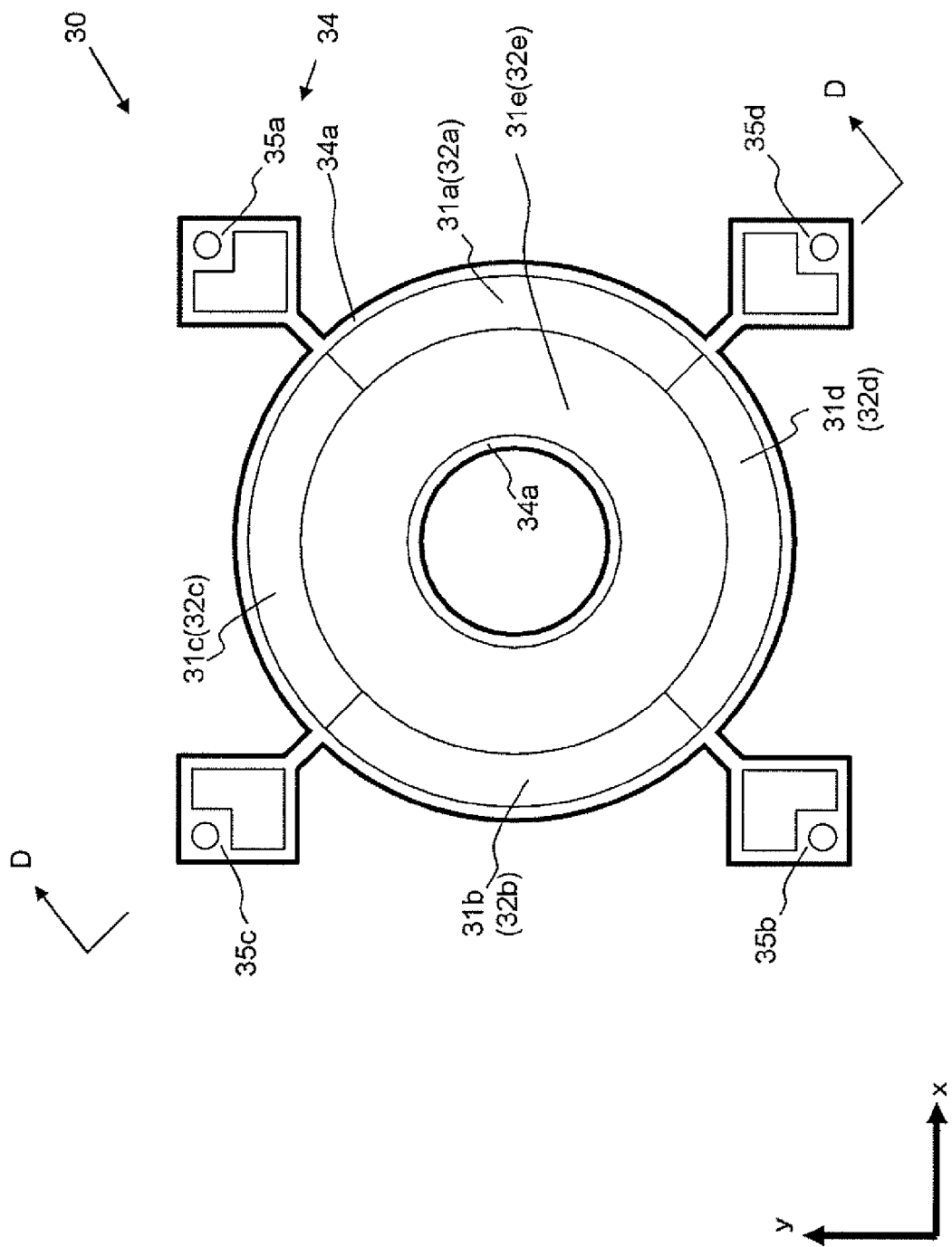
FIG. 8 is a figure showing the construction of the piezoelectric oscillator in the second embodiment.
Figure 9:
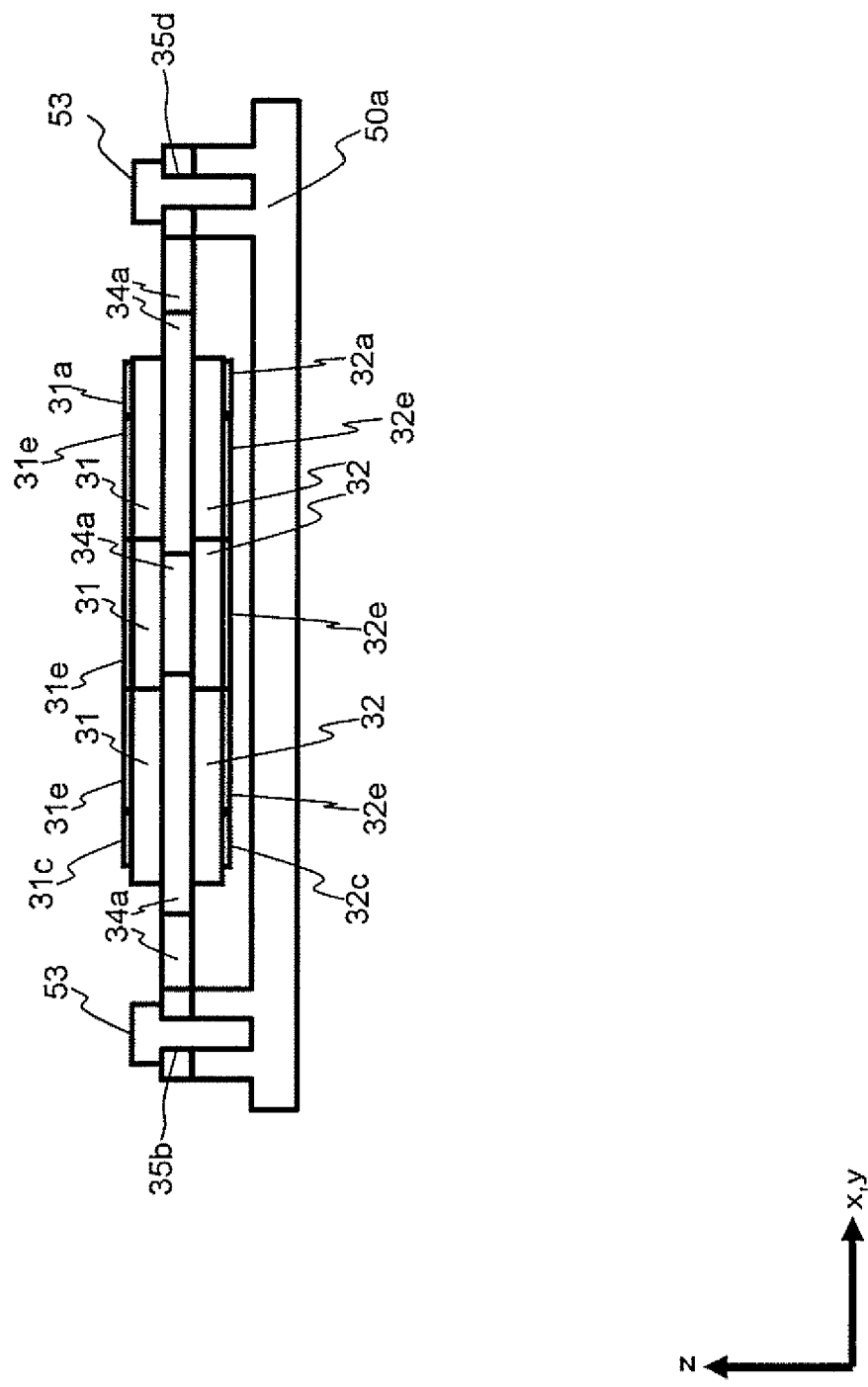
FIG. 9 is a view along line D-D of FIG. 8.

In the second embodiment, electrodes are set on the surfaces of the first and second piezoelectric devices 31 and 32 as viewed from the third direction z (in the x-y plane) (see FIG. 8). Four electrodes are arranged radially on the rim (at the outer side), which is close to the exterior wall of the shim body 34a, as viewed from the third direction z, and one electrode is arranged at the center, as viewed from the third direction z. A first electrode 31a, a second electrode 31b, a third electrode 31c, a fourth electrode 31d, and a ninth electrode 31e are attached to the first piezoelectric device 31. A fifth electrode 32a, a sixth electrode 32b, a seventh electrode 32c, an eighth electrode 32d, and a tenth electrode 32e are attached to the second piezoelectric device 32.

The electrodes are arranged in order of the first, second, third, and fourth electrodes 31a, 31b, 31c, and 31d, counterclockwise, as viewed from the third direction z. The ninth electrode 31e is arranged at the center of the first, second, third, and fourth electrodes 31a, 31b, 31c, and 31d.

The fifth electrode 32a is arranged on the second piezoelectric device 32 so that the first electrode 31a faces the fifth electrode 32a in the third direction z. A first VAC (voltage alternating current) $VE_1$ is applied to the first and fifth electrodes 31a and 32a from the circuit unit 70.

The sixth electrode 32b is arranged on the second piezoelectric device 32 so that the second electrode 31b faces the sixth electrode 32b in the third direction z. A second VAC, $VE_2$, is applied to the second and sixth electrodes 31b and 32b from the circuit unit 70.

The seventh electrode 32c is arranged on the second piezoelectric device 32 so that the third electrode 31c faces the seventh electrode 32c in the third direction z. A third VAC, $VE_3$, is applied to the third and seventh electrodes 31c and 32c from the circuit unit 70.

The eighth electrode 32d is arranged on the second piezoelectric device 32 so that the fourth electrode 31d faces the eighth electrode 32d in the third direction z. A fourth VAC, $VE_4$, is applied to the fourth and eighth electrodes 31d and 32d from the circuit unit 70.

The tenth electrode 32e is arranged on the second piezoelectric device 32 so that the ninth electrode 31e faces the tenth electrode 32e in the third direction z. A fifth VAC, $VE_5$, is applied to the ninth and tenth electrodes 31e and 32e from the circuit unit 70.

The VAC is applied to each of the electrodes, so that the piezoelectric oscillator 30, which has the first and second piezoelectric devices 31 and 32, and the shim 34, repeats the expansion and the shrinkage. When the shape of the piezoelectric oscillator 30 transforms by changing the voltage that is applied to the electrodes 31a, 31b, 31c, 31d, 31e, 32a, 32b, 32c, 32d, and 32e, an arbitrary point of the exterior wall of the shim body 34a can exhibit elliptical motion.

By this elliptical motion, the first and second friction members 11 and 12 that are in contact with the exterior wall of the shim body 34a while being urged in the second direction y are moved in the first direction x against the fixed stand 50 and the piezoelectric oscillator 30, so that the horizontal moving unit 10 and the loading stand 40 are moved in the first direction x.

Similarly, by this elliptical motion, the third and fourth friction members 21 and 22 that are in contact with the exterior wall of the shim body 34a while being urged in the first direction x are moved in the second direction y against the fixed stand 50 and the piezoelectric oscillator 30, so that the vertical moving unit 20 and the loading stand 40 are moved in the second direction y.

Figure 10:
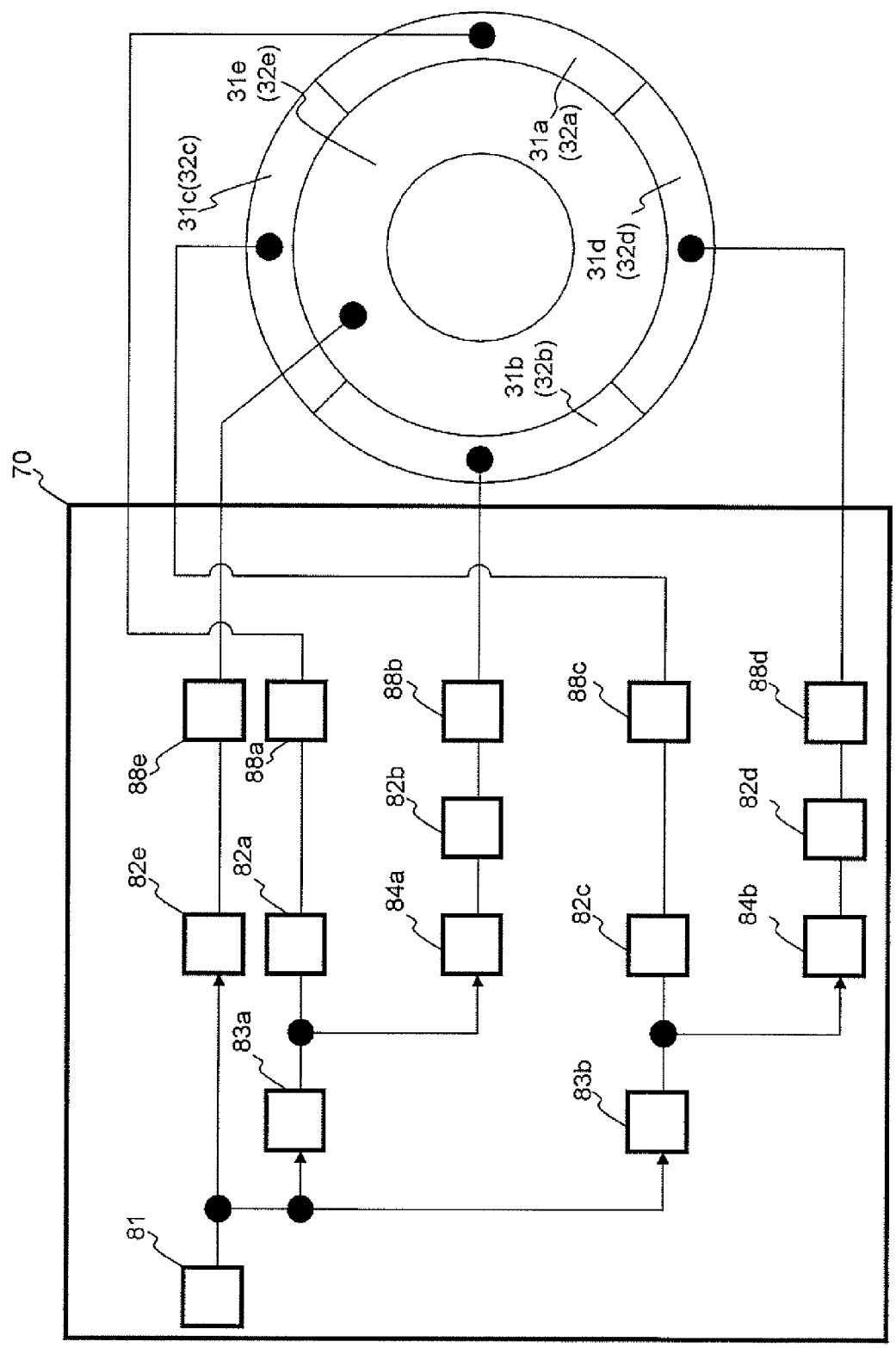
FIG. 10 is a circuit construction diagram in the second embodiment.

The circuit unit 70 in the second embodiment has a variable frequency oscillator (function generator) 81, a first amplifier 82a, a second amplifier 82b, a third amplifier 82c, a fourth amplifier 82d, a fifth amplifier 82e, a first phase shifter 83a, a second phase shifter 83b, a first phase splitter 84a, a second phase splitter 84b, a first electrical power amplifier 88a, a second electrical power amplifier 88b, a third electrical power amplifier 88c, a fourth electrical power amplifier 88d, and a fifth electrical power amplifier 88e (see FIG. 10).

The variable frequency oscillator 81 outputs a sine wave, $V_0 \sin(2\pi ft)$, where $V_0$ is a constant representing the initial amplitude, and f and t are variables representing the frequency and time, respectively. The variable frequency oscillator 81 is connected to the fifth amplifier 82e, the first phase shifter 83a, and the second phase shifter 83b.

The fifth amplifier 82e amplifies the input signal, $V_0 \sin(2\pi ft)$, and outputs a sine wave, $V_5 \sin(2\pi ft)$, which has a fifth amplitude $V_5$ and the frequency f. The fifth amplifier 82e is connected to the fifth electrical power amplifier 88e.

The fifth electrical power amplifier 88e amplifies the input signal, $V_5 \sin(2\pi ft)$, with an amplification rate $A_5$, and outputs the fifth VAC, $VE_5$: $A_5 V_5 \sin(2\pi ft)$. The fifth electrical power amplifier 88e is connected to the ninth electrode 31e and the tenth electrode 32e.

The fifth VAC, $VE_5$, is applied to the ninth and tenth electrodes 31e and 32e.

The first phase shifter 83a changes the phase of the input signal, $V_0 \sin(2\pi ft)$, into a first angle $\theta_1$, and outputs a sine wave, $V_0 \sin(2\pi ft+\theta_1)$, which has the initial amplitude $V_0$ and the frequency f. The first phase shifter 83a is connected to the first amplifier 82a and the first phase splitter 84a.

The second phase shifter 83b changes the phase of the input signal, $V_0 \sin(2\pi ft)$, into a second angle $\theta_2$, and outputs a sine wave, $V_0 \sin(2\pi ft+\theta_2)$, which has the initial amplitude $V_0$ and the frequency f. The second phase shifter 83b is connected to the third amplifier 82c and the second phase splitter 84b.

The first amplifier 82a amplifies the input signal, $V_0 \sin(2\pi ft+\theta_1)$, and outputs a sine wave, $V_1 \sin(2\pi ft+\theta_1)$ which has a first amplitude $V_1$ and the frequency f. The first amplifier 82a is connected to the first electrical power amplifier 88a.

The first electrical power amplifier 88a amplifies the input signal, $V_1 \sin(2\pi ft+\theta_1)$, with an amplification rate $A_1$, and outputs the first VAC, $VE_1$: $A_1 V_1 \sin(2\pi ft+\theta_1)$. The first electrical power amplifier 88a is connected to the first electrode 31a and the fifth electrode 32a.

The first VAC, $VE_1$, is applied to the first and fifth electrodes 31a and 32a.

The first phase splitter 84a inverts the phase of the input signal, $V_0 \sin(2\pi ft+\theta_1)$, and outputs a sine wave, $-V_0 \sin(2\pi ft+\theta_1)$, which has the initial amplitude $V_0$ and the frequency f. The first phase splitter 84a is connected to the second amplifier 82b.

The second amplifier 82b amplifies the input signal, $-V_0 \sin(2\pi ft+\theta_1)$, and outputs a sine wave, $-V_2 \sin(2\pi ft+\theta_1)$, which has a second amplitude $V_2$ and the frequency f. The second amplifier 82b is connected to the second electrical power amplifier 88b.

The second electrical power amplifier 88b amplifies the input signal, $-V_2 \sin(2\pi ft+\theta_1)$, with an amplification rate $A_2$, and outputs the second VAC, $VE_2$: $-A_2 V_2 \sin(2\pi ft+\theta_1)$. The second electrical power amplifier 88b is connected to the second electrode 31b and the sixth electrode 32b.

The second VAC, $VE_2$, is applied to the second and sixth electrodes 31b and 32b.

The third amplifier 82c amplifies the input signal, $V_0 \sin(2\pi ft+\theta_2)$, and outputs a sine wave, $V_3 \sin(2\pi ft+\theta_2)$, which has a third amplitude $V_3$ and the frequency f. The third amplifier 82c is connected to the third electrical power amplifier 88c.

The third electrical power amplifier 88c amplifies the input signal, $V_3 \sin(2\pi ft+\theta_2)$, with an amplification rate $A_3$, and outputs the third VAC, $VE_3$: $A_3 V_3 \sin(2\pi ft+\theta_2)$. The third electrical power amplifier 88c is connected to the third electrode 31c and the seventh electrode 32c.

The third VAC, $VE_3$, is applied to the third and seventh electrodes 31c and 32c.

The second phase splitter 84b inverts the phase of the input signal, $V_0 \sin(2\pi ft+\theta_2)$, and outputs a sine wave, $-V_0 \sin(2\pi ft+\theta_2)$, which has the initial amplitude $V_0$ and the frequency f. The second phase splitter 84b is connected to the fourth amplifier 82d.

The fourth amplifier 82d amplifies the input signal, $-V_0 \sin(2\pi ft+\theta_2)$, and outputs a sine wave, $-V_4 \sin(2\pi ft+\theta_2)$ which has a fourth amplitude $V_4$ and the frequency f. The fourth amplifier 82d is connected to the fourth electrical power amplifier 88d.

The fourth electrical power amplifier 88d amplifies the input signal, $-V_4 \sin(2\pi ft+\theta_2)$, with an amplification rate $A_4$, and outputs the fourth VAC, $VE_4$: $-A_4 V_4 \sin(2\pi ft+\theta_2)$. The fourth electrical power amplifier 88d is connected to the fourth electrode 31d and the eighth electrode 32d.

The fourth VAC $VE_4$ is applied to the fourth and eighth electrodes 31d and 32d.

The movement quantity of the horizontal moving unit 10 and other components in the first direction x, and the movement quantity of the vertical moving unit 20 and other components in the second direction y, are adjusted by changing the wave forms of the first, second, third, fourth, and fifth VACs $VE_1$, $VE_2$, $VE_3$, $VE_4$, and $VE_5$.

The wave forms of the first, second, third, fourth, and fifth VACs $VE_1$, $VE_2$, $VE_3$, $VE_4$, and $VE_5$ are modified by changing values of the frequency f, the first and second angles $\theta_1$ and $\theta_2$, the amplification rates $A_1$, $A_2$, $A_3$, $A_4$, and $A_5$ and other factors in the circuit unit 70.

The other constructions of the two-dimensional moving apparatus 1 in the second embodiment are the same as those in the first embodiment.

Next, the third embodiment is explained.

In the first embodiment, by the elastic member (the board-shaped spring 18d), the end 11a of the first friction member 11 is urged in the second direction y and in the same side of the piezoelectric oscillator 30 (FIGS. 11, 12, and 13), and by the elastic member (the board-shaped spring), the end of the third friction member 21 is urged in the first direction x and in the same side of the piezoelectric oscillator 30 (not depicted).

However, in the third embodiment, by an elastic member (the helical compression spring), the first friction member 11 is urged in the second direction y and in the same side of the piezoelectric oscillator 30, and is urged in the first direction x, and by the elastic member (the helical compression spring), the third friction member 21 is urged in the first direction x and in the same side of the piezoelectric oscillator 30, and is urged in the second direction y.

Therefore, the construction between the first friction member 11 and the horizontal moving frame 19, and the construction between the third friction member 21 and the vertical moving frame 29 are different from those in the first embodiment. The differences from the first embodiment are outlined as follows.

It is explained that the first friction member 11 is urged in the second direction y and in the same side of the piezoelectric oscillator 30, and is urged in the first direction x (see FIG. 14).

A part of a side of the first friction member 11 is guided into an inner wall of a guide hole 181c of the horizontal moving frame 19 so that the first friction member 11 is immobile in the third direction z.

A first helical compression spring 181e, a second helical compression spring 181f, and a third helical compression spring 181g, which are all elastic members, are set into the recess of the guide hole 181c of the horizontal moving frame 19.

The first and second helical compression springs 181e and 181f catches and urges the first friction member 11 in the first direction x. The third helical compression spring 181g urges the first friction member 11 in the second direction y. The first friction member 11 comes into contact with the guide hole 181c of the horizontal moving frame 19 through the first, second and third helical compression springs 181e, 181f, and 181g.

The form, rigidity, and mass of the first friction member 11 are designed so that a first resonance point (frequency) of the bending direction of the first friction member 11 is sufficiently higher than the driving frequency of the piezoelectric oscillator 30. The reason for this is to prevent resonation between the driving frequency of the piezoelectric oscillator 30 and the higher-order resonance frequency of the first friction member 11.

Further, when the spring constants of the first, second, and third helical compression springs 181e, 181f, and 181g are designed to be small, a function to restrain minute vibration of the first friction member 11 rises, but, on the other hand, the loss of the driving force by the first friction member 11 grows, so that the driving force by the first friction member 11 damps. Therefore, the most suitable spring constants of the first, second, and third helical compression springs 181e, 181f, and 181g are appropriately set by trial and error.

When the first friction member 11 receives a force in a radial direction (in the second direction y) from the piezoelectric oscillator 30, vibration of the radial direction is transmitted to the first friction member 11, so that the first friction member 11 generates vibration of minute amplitude. However, the third helical compression spring 181g restrains the vibration of minute amplitude, so that the vibration of minute amplitude of the first friction member 11 is almost not transmitted to the horizontal moving frame 19.

When the first friction member 11 receives a force in a driving direction (in the first direction x) from the piezoelectric oscillator 30, vibration of the driving direction is transmitted to the first friction member 11, so that the first friction member 11 generates vibration of minute amplitude. However, the first and second helical compression springs 181e and 181f restrain the vibration of minute amplitude, so that the vibration of minute amplitude of the first friction member 11 is almost not transmitted to the horizontal moving frame 19.

By the first, second, and third helical compression springs 181e, 181f, and 181g between the first friction member 11 and the horizontal moving frame 19, the effect of vibration from the piezoelectric oscillator 30 to the horizontal moving frame 19 can be made small, so that the drive stability of the two-dimensional moving apparatus 1 can be maintained well.

The construction of a part that urges the third friction member 21 in the first direction x and in the same side of the piezoelectric oscillator 30, and in the second direction y, is similar to the construction of the part that urges the first friction member 11 in the second direction y and in the same side of the piezoelectric oscillator 30, and in the first direction x (not depicted).

A part of side of the third friction member 21 is guided into an inner wall of the guide hole of the vertical moving frame 29 so that the third friction member 21 is immobile in the third direction z.

A fourth helical compression spring 281e, a fifth helical compression spring 281f, and a sixth helical compression spring 281g, which are all elastic members, are set into the recess of the guide hole of the vertical moving frame 29.

The fourth and fifth helical compression springs 281e and 281f catch and urge the third friction member 21 in the second direction y. The sixth helical compression spring 281g urges the third friction member 21 in the first direction x. The third friction member 21 comes into contact with the guide hole of the vertical moving frame 29 through the fourth, fifth and sixth helical compression springs 281e, 281f, and 281g.

The form, rigidity, and mass of the third friction member 21 are designed so that a first resonance point (frequency) of the bending direction of the third friction member 21 is sufficiently higher than the driving frequency of the piezoelectric oscillator 30. The reason for this is to prevent resonation between the driving frequency of the piezoelectric oscillator 30 and the higher-order resonance frequency of the third friction member 21.

Further, when the spring constants of the fourth, fifth, and sixth helical compression springs 281e, 281f, and 281g are designed to be small, a function to restrain minute vibration of the third friction member 21 rises, but, on the other hand, the loss of the driving force by the third friction member 21 grows, so that the driving force by the third friction member 21 damps. Therefore, the most suitable spring constants of the fourth, fifth, and sixth helical compression springs 281e, 281f, and 281g are appropriately set by trial and error.

When the third friction member 21 receives a force in a radial direction (in the first direction x) from the piezoelectric oscillator 30, the vibration in the radial direction is transmitted to the third friction member 21, so that the third friction member 21 generates vibration of minute amplitude. However, the sixth helical compression spring 281g restrains the vibration of minute amplitude, so that the vibration of minute amplitude of the third friction member 21 is almost not transmitted to the vertical moving frame 29.

When the third friction member 21 receives a force in a driving direction (in the second direction y) from the piezoelectric oscillator 30, the vibration in the driving direction is transmitted to the third friction member 21, so that the third friction member 21 generates vibration of minute amplitude. However, the fourth and fifth helical compression springs 281e and 281f restrain the vibration of minute amplitude, so that the vibration of minute amplitude of the third friction member 21 is almost not transmitted to the vertical moving frame 29.

By the fourth, fifth, and sixth helical compression springs 281e, 281f, and 281g between the third friction member 21 and the vertical moving frame 29, the effect of the vibration from the piezoelectric oscillator 30 to the vertical moving frame 29 can be made small, so that the drive stability of the two-dimensional moving apparatus 1 can be maintained well.

The other constructions of the two-dimensional moving apparatus 1 in the third embodiment are the same as those in the first embodiment.

Next, the fourth embodiment is explained. In the third embodiment, the first friction member 11 comes into contact with the horizontal moving frame 19 through the elastic member (the helical compression spring), the third friction member 21 comes into contact with the vertical moving frame 29 through the elastic member (the helical compression spring), the second friction member 12 is fixed to the horizontal moving frame 19, and the fourth friction member 22 is fixed to the vertical moving frame 29, similarly to with the first embodiment.

In the fourth embodiment, the second friction member 12 comes into contact with the horizontal moving frame 19 through the elastic member (the helical compression spring), and the fourth friction member 22 comes into contact with the vertical moving frame 29 through the elastic member (the helical compression spring).

The differences from the third embodiment are outlined as follows.

Figure 15:
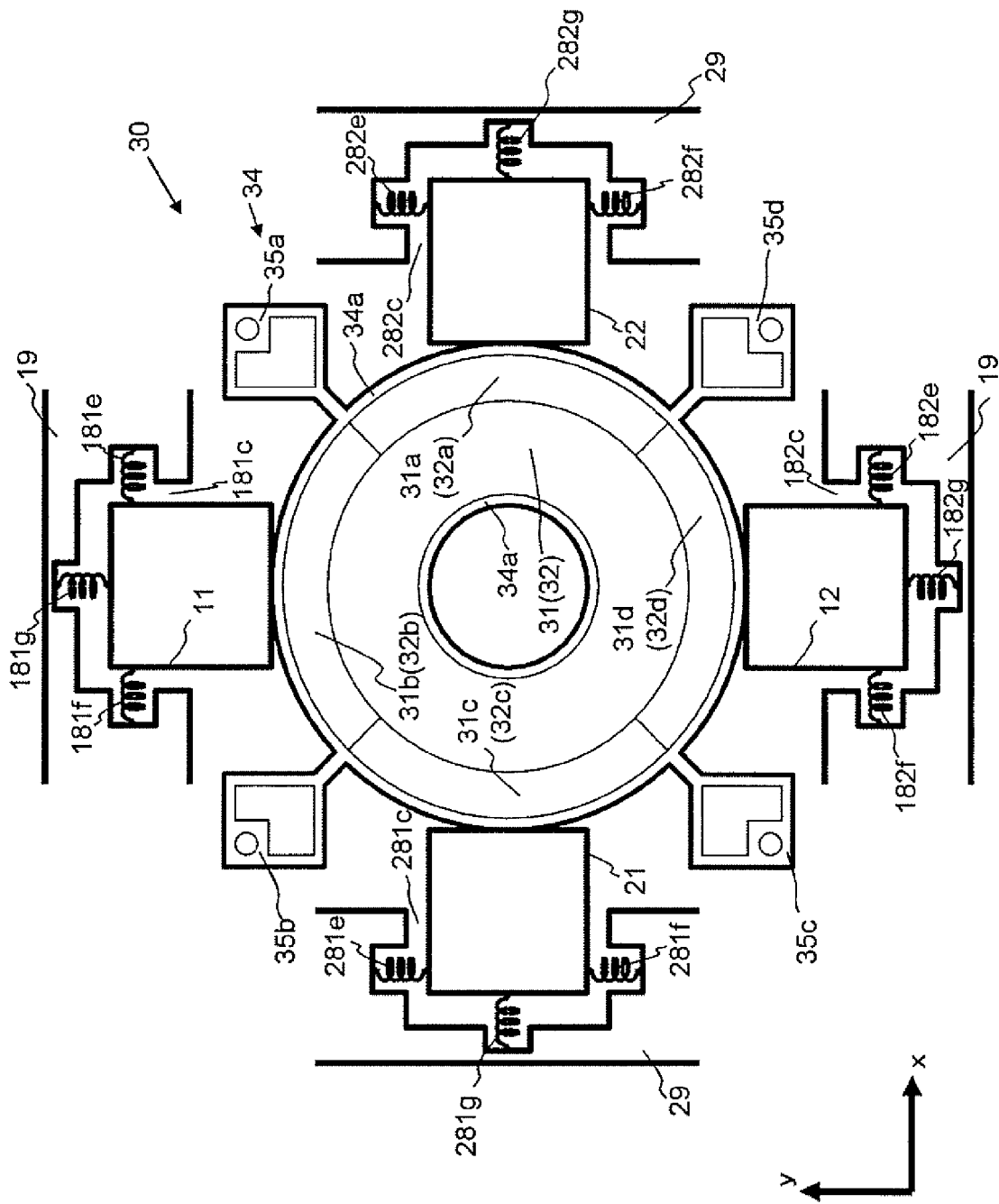
FIG. 15 is a figure showing the construction of a part that urges the first, second, third, and fourth friction members, and the piezoelectric oscillator, in the fourth embodiment.

The construction of a part that urges the first friction member 11 in the second direction y and in the same side of the piezoelectric oscillator 30, and in the first direction x, is the same as that in the third embodiment (see FIGS. 14 and 15).

The construction of a part that urges the second friction member 12 in the second direction y and in the same side of the piezoelectric oscillator 30, and in the first direction x, is similar to the construction of the part that urges the first friction member 11 in the second direction y and in the same side of the piezoelectric oscillator 30, and in the first direction x (see FIG. 15).

A part of a side of the second friction member 12 is guided into an inner wall of a second guide hole 182c of the horizontal moving frame 19 so that the second friction member 12 is immobile in the third direction z.

A seventh helical compression spring 182e, an eighth helical compression spring 182f, and a ninth helical compression spring 182g, which are all elastic members, are set into the recess of the second guide hole 182c of the horizontal moving frame 19.

The seventh and eighth helical compression springs 182e and 182f catch and urge the second friction member 12 in the first direction x. The ninth helical compression spring 182g urges the second friction member 12 in the second direction y. The second friction member 12 comes into contact with the second guide hole 182c of the horizontal moving frame 19, through the seventh, eighth and ninth helical compression springs 182e, 182f, and 182g.

The form, rigidity, and mass of the second friction member 12 are designed so that a first resonance point (frequency) of the bending direction of the second friction member 12 is sufficiently higher than the driving frequency of the piezoelectric oscillator 30. The reason for this is to prevent resonation between the driving frequency of the piezoelectric oscillator 30 and the higher-order resonance frequency of the second friction member 12.

Further, when the spring constants of the seventh, eighth, and ninth helical compression springs 182e, 182f, and 182g are designed to be small, a function to restrain minute vibration of the second friction member 12 rises, but, on the other hand, the loss of the driving force by the second friction member 12 grows, so that the driving force by the second friction member 12 damps. Therefore, the most suitable spring constants of the seventh, eighth, and ninth helical compression springs 182e, 182f, and 182g are appropriately set by trial and error.

When the second friction member 12 receives a force in a radial direction (in the second direction y) from the piezoelectric oscillator 30, vibration of the radial direction is transmitted to the second friction member 12, so that the second friction member 12 generates vibration of minute amplitude. However, the ninth helical compression spring 182g restrains the vibration of minute amplitude, so that the vibration of minute amplitude of the second friction member 12 is almost not transmitted to the horizontal moving frame 19.

When the second friction member 12 receives a force in a driving direction (in the first direction x) from the piezoelectric oscillator 30, vibration of the driving direction is transmitted to the second friction member 12, so that the second friction member 12 generates vibration of minute amplitude. However, the seventh and eighth helical compression springs 182e and 182f restrain the vibration of minute amplitude, so that the vibration of minute amplitude of the second friction member 12 is almost not transmitted to the horizontal moving frame 19.

By the seventh, eighth, and ninth helical compression springs 182e, 182f, and 182g between the second friction member 12 and the horizontal moving frame 19, the effect of the vibration from the piezoelectric oscillator 30 to the horizontal moving frame 19 can be made small, so that the drive stability of the two-dimensional moving apparatus 1 can be maintained well.

In the third embodiment, because the second friction member 12 is fixed to the horizontal moving frame 19, vibration from the piezoelectric oscillator 30 is transmitted to the horizontal moving frame 19. A fixed member that the second friction member 12 and the horizontal moving frame 19 are attached to is larger than the piezoelectric oscillator 30, so that a first resonance point (frequency) of the bending direction of the fixed member may be lower than the driving frequency of the piezoelectric oscillator 30, In this case, the driving frequency of the piezoelectric oscillator 30 and the higher order resonance frequency of the fixed member may resonate.

However, in the fourth embodiment, the second friction member 12 is not fixed to the horizontal moving frame 19, so that the second friction member 12 comes into contact with the horizontal moving frame 19 through the elastic member (the helical compression spring). Accordingly, vibration from the piezoelectric oscillator 30 is restrained by the elastic member (the helical compression spring), so that the above-described problem does not occur.

The construction of a part that urges the third friction member 21 in the first direction x and in the same side of the piezoelectric oscillator 30, and in the second direction y, is the same as that in the third embodiment (see FIG. 15).

A part of a side of the third friction member 21 is guided into an inner wall of a third guide hole 281c of the vertical moving frame 29 so that the third friction member 21 is immobile in the third direction z.

A fourth helical compression spring 281e, a fifth helical compression spring 281f, and a sixth helical compression spring 281g, which are all elastic members, are set into the recess of the third guide hole 281c of the vertical moving frame 29.

The fourth and fifth helical compression springs 281e and 281f catch and urge the third friction member 21 in the second direction y. The sixth helical compression spring 281g urges the third friction member 21 in the first direction x. The third friction member 21 comes into contact with the third guide hole 281c of the vertical moving frame 29 through the fourth, fifth and sixth helical compression springs 281e, 281f, and 281g.

The form, rigidity, and mass of the third friction member 21 are designed so that a first resonance point (frequency) of the bending direction of the third friction member 21 is sufficiently higher than the driving frequency of the piezoelectric oscillator 30. The reason for this is to prevent resonation between the driving frequency of the piezoelectric oscillator 30 and the higher-order resonance frequency of the third friction member 21.

Further, when the spring constants of the fourth, fifth, and sixth helical compression springs 281e, 281f, and 281g are designed to be small, a function to restrain minute vibration of the third friction member 21 rises, but, on the other hand, the loss of the driving force by the third friction member 21 grows, so that the driving force by the third friction member 21 damps. Therefore, the most suitable spring constants of the fourth, fifth, and sixth helical compression springs 281e, 281f, and 281g are appropriately set by trial and error.

When the third friction member 21 receives a force in a radial direction (in the first direction x) from the piezoelectric oscillator 30, vibration of the radial direction is transmitted to the third friction member 21, so that the third friction member 21 generates vibration of minute amplitude. However, the sixth helical compression spring 281g restrains the vibration of minute amplitude, so that the vibration of minute amplitude of the third friction member 21 is almost not transmitted to the vertical moving frame 29.

When the third friction member 21 receives a force in a driving direction (in the second direction y) from the piezoelectric oscillator 30, vibration of the driving direction is transmitted to the third friction member 21, so that the third friction member 21 generates vibration of minute amplitude. However, the fourth and fifth helical compression springs 281e and 281f restrain the vibration of minute amplitude, so that the vibration of minute amplitude of the third friction member 21 is almost not transmitted to the vertical moving frame 29.

By the fourth, fifth, and sixth helical compression springs 281e, 281f, and 281g between the third friction member 21 and the vertical moving frame 29, the effect of the vibration from the piezoelectric oscillator 30 to the vertical moving frame 29 can be made small, so that the drive stability of the two-dimensional moving apparatus 1 can be maintained well.

The construction of a part that urges the fourth friction member 22 in the first direction x and in the same side of the piezoelectric oscillator 30, and in the second direction y, is similar to the construction of the part that urges the third friction member 21 in the first direction x and in the same side of the piezoelectric oscillator 30, and in the second direction y (see FIG. 15).

A part of side of the fourth friction member 22 is guided into an inner wall of a fourth guide hole 282c of the vertical moving frame 29 so that the fourth friction member 22 is immobile in the third direction z.

A tenth helical compression spring 282e, an eleventh helical compression spring 282f, and a twelfth helical compression spring 282g, which are all elastic members, are set into the recess of the fourth guide hole 282c of the vertical moving frame 29.

The tenth and eleventh helical compression springs 282e and 282f catch and urge the fourth friction member 22 in the second direction y. The twelfth helical compression spring 282g urges the fourth friction member 22 in the first direction x. The fourth friction member 22 comes into contact with the fourth guide hole 282c of the vertical moving frame 29 through the tenth, eleventh and twelfth helical compression springs 282e, 282f, and 282g.

The form, rigidity, and mass of the fourth friction member 22 are designed so that a first resonance point (frequency) of the bending direction of the fourth friction member 22 is sufficiently higher than the driving frequency of the piezoelectric oscillator 30. The reason for this is to prevent resonation between the driving frequency of the piezoelectric oscillator 30 and the higher-order resonance frequency of the fourth friction member 22.

Further, when the spring constants of the tenth, eleventh, and twelfth helical compression springs 282e, 282f, and 282g are designed to be small, a function to restrain minute vibration of the fourth friction member 22 rises, but, on the other hand, the loss of the driving force by the fourth friction member 22 grows, so that the driving force by the fourth friction member 22 damps. Therefore, the most suitable spring constants of the tenth, eleventh, and twelfth helical compression springs 282e, 282f, and 282g are appropriately set by trial and error.

When the fourth friction member 22 receives a force in a radial direction (in the first direction x) from the piezoelectric oscillator 30, vibration of the radial direction is transmitted to the fourth friction member 22, so that the fourth friction member 22 generates vibration of minute amplitude. However, the twelfth helical compression spring 282g restrains the vibration of minute amplitude, so that the vibration of minute amplitude of the fourth friction member 22 is almost not transmitted to the vertical moving frame 29.

When the fourth friction member 22 receives a force in a driving direction (in the second direction y) from the piezoelectric oscillator 30, the vibration of the driving direction is transmitted to the fourth friction member 22, so that the fourth friction member 22 generates vibration of minute amplitude. However, the tenth and eleventh helical compression springs 282e and 282f restrain the vibration of minute amplitude, so that the vibration of minute amplitude of the fourth friction member 22 is almost not transmitted to the vertical moving frame 29.

By the tenth, eleventh, and twelfth helical compression springs 282e, 282f, and 282g between the fourth friction member 22 and the vertical moving frame 29, the effect of the vibration from the piezoelectric oscillator 30 to the vertical moving frame 29 can be made small, so that the drive stability of the two-dimensional moving apparatus 1 can be maintained well.

In the third embodiment, because the fourth friction member 22 is attached to the vertical moving frame 29, vibration from the piezoelectric oscillator 30 is transmitted to the vertical moving frame 29. A fixed member that the fourth friction member 22 and the vertical moving frame 29 are attached to is larger than the piezoelectric oscillator 30, so that a first resonance point (frequency) of the bending direction of the fixed member may be lower than the driving frequency of the piezoelectric oscillator 30. In this case, the driving frequency of the piezoelectric oscillator 30 and the higher order resonance frequency of the fixed member may resonate.

However, in the fourth embodiment, the fourth friction member 22 is not fixed to the vertical moving frame 29, so that the fourth friction member 22 comes into contact with the vertical moving frame 29 through the elastic member (the helical compression spring). Accordingly, vibration from the piezoelectric oscillator 30 is restrained by the elastic member (the helical compression spring), so that the above-described problem does not occur.

The other constructions of the two-dimensional moving apparatus 1 in the fourth embodiment are the same as those in the third embodiment.

Next, the fifth embodiment is explained. In the fifth embodiment, the forms of the horizontal moving frame 19 and the vertical moving frame 29 are different from those in the fourth embodiment.

The differences from the fourth embodiment are outlined as follows.

In the fifth embodiment, the horizontal moving frame 190 has a first horizontal moving frame projection 191, a second horizontal moving frame projection 192, a first cover 193, and a second cover 194.

The first horizontal moving frame projection 191 is a member that overhangs from the board-shaped body of the horizontal moving frame 190 in the third direction z, and has a first guide hole 181c that is used for urging (pressing) the first friction member 11. The first, second, and third helical compression springs 181e, 181f, and 181g are inserted into the first guide hole 181c.

The first cover 193 is a cover used to hide the first guide hole 181c so that it is not seen from the third direction z, and the urging (pressing) force of the first friction member 11 does not weaken in the third direction z.

The second horizontal moving frame projection 192 is a member that overhangs from the board-shaped body of the horizontal moving frame 190 in the third direction z, and has a second guide hole 182c that is used for urging (pressing) the second friction member 12. The seventh, eighth, and ninth helical compression springs 182e, 182f, and 182g are inserted into the second guide hole 182c.

The second cover 194 is a cover used to hide the second guide hole 182c so that it is not seen from the third direction z, and the urging (pressing) force of the second friction member 12 does not weaken in the third direction z.

In the fifth embodiment, the vertical moving frame 290 has a first vertical moving frame projection 291, a second vertical moving frame projection 292, a third cover 293, and a fourth cover 294.

The first vertical moving frame projection 291 is a member that overhangs from the board-shaped body of the vertical moving frame 290 in the third direction z, and has a third guide hole 281c that is used for urging (pressing) the third friction member 21. The fourth, fifth, and sixth helical compression springs 281e, 281f, and 281g are inserted into the third guide hole 281c.

The third cover 293 is a cover used to hide the third guide hole 281c so that it is not seen from the third direction z, and the urging (pressing) force of the third friction member 21 does not weaken in the third direction z.

The second vertical moving frame projection 292 is a member that overhangs from the board-shaped body of the vertical moving frame 290 in the third direction z, and has a fourth guide hole 282c that is used for urging (pressing) the fourth friction member 22. The tenth, eleventh, and twelfth helical compression springs 282e, 282f, and 282g are inserted into the fourth guide hole 282c.

The fourth cover 294 is a cover used to hide the fourth guide hole 282c so that it is not seen from the third direction z, and the urging (pressing) force of the fourth friction member 22 does not weaken in the third direction z.

The directions of projection of the first and second horizontal moving frame projections 191 and 192 from the board-shaped body of the horizontal moving frame 190 in the third direction z are the same.

The directions of projection of the first and second vertical moving frame projections 291 and 292 from the board-shaped body of the vertical moving frame 290 in the third direction z are the same.

The direction of projection of the first horizontal moving frame projection 191 from the board-shaped body of the horizontal moving frame 190 in the third direction z, and the direction of projection of the first vertical moving frame projection 291 from the board-shaped body of the vertical moving frame 290 in the third direction z are opposite to each other.

Therefore, in the fifth embodiment, the constructions of the horizontal moving frame 190 and the vertical moving frame 290 can be simplified without using the nesting construction or the cantilever construction, which uses the coil spring.

The other constructions of the two-dimensional moving apparatus 1 in the fifth embodiment are the same as those in the fourth embodiment.

In the first, second, third, fourth, and fifth embodiments, the driving frequency for applying the first VAC, $VE_1$, the first and fifth electrodes 31a and 32a, the driving frequency for applying the second VAC, $VE_2$, the second and sixth electrodes 31b and 32b, the driving frequency for applying the third VAC, $VE_3$, the third and seventh electrodes 31c and 32c, the driving frequency for applying the fourth VAC, $VE_4$, the fourth and eighth electrodes 31d and 32d, and the driving frequency for applying the fifth VAC, $VE_5$, the ninth and tenth electrodes 31e and 32e are set to the same value, f. Therefore, the construction of the circuit can be simplified, compared to the case in which the driving frequencies are not identical.

Further, the control of the movement in the two directions can be performed by one piezoelectric oscillator. Accordingly, the size of the piezoelectric oscillator can be enlarged, compared to the case in which the control of the movement in the two directions is performed by two or more piezoelectric oscillators. When the size of the piezoelectric oscillator is enlarged, the driving frequency of the piezoelectric oscillator can be set to about 100 kHz, so that the driving circuit (the circuit unit 70) can be easily designed without consideration about switching loss that occurs when the driving frequency of the piezoelectric oscillator is set in the range between 200 and 300 KHz.

Pressurizing (Urging) the piezoelectric oscillator 30 in the first direction x is performed by the first and second friction members 11 and 12, which are set inside the horizontal moving frame 19. Pressurizing (Urging) the piezoelectric oscillator 30 in the second direction y is performed by the third and fourth friction members 21 and 22, which are set inside the vertical moving frame 29. Therefore, a structure that pressurizes (urges) from outside the horizontal moving frame 19 or the vertical moving frame 29 is not needed, so that the two-dimensional moving apparatus 1 can be downsized. Further, there is the advantage that it is easy to harmonize the two-dimensional moving apparatus 1 as a whole.

In the embodiments, the forms of the first and second piezoelectric devices 31 and 32 and the shim body 34a are designed as tube (hollow circular cylinder) shapes, taking into account the downsizing of the apparatus and the improvement of driving efficiency of the piezoelectric oscillator. However, another shape, for example, a regular m-polygon prism shape (where "m" is a multiple of four) or a cylinder shape, can be used.

In the embodiments, the form of the piezoelectric oscillator 30 is designed as a tube shape, so that the piezoelectric oscillator 30 has a symmetrical shape in both the first direction x and the second direction y.

Further, in the embodiments, the first friction member 11 and the second friction member 12 are symmetrically arranged in the second direction y centering on the piezoelectric oscillator 30, and the third friction member 21 and the fourth friction member 22 are symmetrically arranged in the first direction x centering on the piezoelectric oscillator 30.

In the embodiments, the two-dimensional moving apparatus 1 urges the piezoelectric oscillator 30 in the first direction x and in the second direction y, and does not urge the piezoelectric oscillator 30 in the third direction z. Accordingly, a member that enlarges the size of the apparatus in the third direction z is not needed, so that the driven apparatus can be moved in the two-dimensional directions, without increasing the thickness in a direction that is perpendicular to the movement plane.

Although these embodiments of the present invention have been described herein with reference to the accompanying drawings, obviously many modifications and changes may be made by those skilled in this art without departing from the scope of the invention.

The present disclosure relates to subject matter contained in Japanese Patent Application Nos. 2005-215834 (filed on Jul. 26, 2005) and 2005-368600 (filed on Dec. 21, 2005), which are expressly incorporated herein by reference, in their entirety.

The invention claimed is:

1. A piezoelectric oscillator, comprising:
   an exterior wall that moves a first urging member urging said exterior wall in a first direction, and moves a second urging member urging said exterior wall in a second direction that is perpendicular to said first direction;
   wherein said first urging member is moved in said second direction on the basis of vibration, and said second urging member is moved in said first direction on the basis of said vibration.

2. The piezoelectric oscillator according to claim 1, wherein said piezoelectric oscillator has a cylinder shape.

3. The piezoelectric oscillator according to claim 1, wherein said piezoelectric oscillator has a first piezoelectric device, a second piezoelectric device, and a shim; and
   said first and second piezoelectric devices are fixed to said shim in a third direction that is perpendicular to said first and second directions.

4. The piezoelectric oscillator according to claim 3, wherein electrodes are attached on said first and second piezoelectric devices; and
   voltage alternating current which occurs as a result of said vibration is applied to said electrodes.

5. The piezoelectric oscillator according to claim 4, wherein four electrodes are attached to said first and second piezoelectric devices radially; and
   at least either the altitude or the phase of the wave form of said voltage alternating current that is applied to said four electrodes is adjusted on the basis of a movement quantity of said first urging member in said second direction and a movement quantity of said second urging member in said first direction.

6. The piezoelectric oscillator according to claim 4, wherein four electrodes are attached to said first and second piezoelectric devices radially at an outer side that is close to said exterior wall;
   electrodes are attached on said first and second piezoelectric devices at their centers;
   at least either the altitude or the phase of the wave form of said voltage alternating current that is applied to said five electrodes is adjusted on the basis of a movement quantity of said first urging member in said second direction and a movement quantity of said second urging member in said first direction.

7. A two-dimensional moving apparatus, comprising:
   a fixed unit that has a piezoelectric oscillator;
   a vertical moving unit that comes into contact with an exterior wall of said piezoelectric oscillator, and urges said exterior wall in a first direction, and is movable in a second direction that is perpendicular to said first direction, on the basis of vibration of said piezoelectric oscillator;
   a horizontal moving unit that comes into contact with said exterior wall, and urges said exterior wall in said second direction, and is movable in said first direction on the basis of said vibration; and
   a loading stand that links a movement of said vertical moving unit in said second direction and moves, that supports said vertical moving unit slidably in said first direction, that links a movement of said horizontal moving unit in said first direction and moves, and that supports said horizontal moving unit slidably in said second direction;
   said fixed unit supporting said vertical moving unit slidably in said second direction, and supporting said horizontal moving unit slidably in said first direction.

8. The two-dimensional moving apparatus according to claim 7, wherein said horizontal moving unit has a horizontal moving frame, and has first and second friction members that urge said exterior wall in said second direction, and that are attached to said horizontal moving frame; and
   said vertical moving unit has a vertical moving frame, and has third and fourth friction members that urge said exterior wall in said first direction, and that are attached to said vertical moving frame.

9. The two-dimensional moving apparatus according to claim 8, wherein said first friction member comes into contact with said horizontal moving frame through an elastic member; and
   said third friction member comes into contact with said vertical moving frame through an elastic member.

10. The two-dimensional moving apparatus according to claim 9, wherein said second friction member comes into contact with said horizontal moving frame through an elastic member; and
    said fourth friction member comes into contact with said vertical moving frame through an elastic member.

11. The two-dimensional moving apparatus according to claim 10, wherein said first and second friction members are urged in said second direction and in the same side of said piezoelectric oscillator, and in said first direction, by said elastic member; and
    said third and fourth friction members are urged in said first direction and in the same side of said piezoelectric oscillator, and in said second direction, by said elastic member.

12. The two-dimensional moving apparatus according to claim 8, wherein a part of said first friction member is inserted into a guide hole of said horizontal moving frame,
    said first friction member is supported and is urged in said second direction, so that said first friction member is movable only in said second direction relative to said horizontal moving frame;
    apart of said third friction member is inserted into a guide hole of said vertical moving frame; and
    said third friction member is supported and is urged in said first direction, so that said third friction member is movable only in said first direction relative to said vertical moving frame.

13. The two-dimensional moving apparatus according to claim 8, wherein said horizontal moving frame has first and second horizontal moving frame projections;

said first friction member is attached to said first horizontal moving frame projection;

said second friction member is attached to said second horizontal moving frame projection;

said vertical moving frame has first and second vertical moving frame projections;

said third friction member is attached to said first vertical moving frame projection;

said fourth friction member is attached to said second vertical moving frame projection;

directions of the projection of said first and second horizontal moving frame projections from said horizontal moving frame in a third direction that is perpendicular to said first and second directions are the same;

directions of the projection of said first and second vertical moving frame projections from said vertical moving frame in said third direction are the same; and said direction of the projection of said first horizontal moving frame projection from said horizontal moving frame in said third direction, and said direction of the projection of said first vertical moving frame projection from said vertical moving frame in said third direction are opposite to each other.

14. The two-dimensional moving apparatus according to claim 8, wherein said horizontal moving frame has a horizontal moving frame beam, a horizontal moving frame support unit, and a horizontal moving frame elastic member;

said horizontal moving frame beam is urged to approach said horizontal moving frame support unit by said horizontal moving frame elastic member;

said vertical moving frame has a vertical moving frame beam, a vertical moving frame support unit, and a vertical moving frame elastic member; and said vertical moving frame beam is urged to approach said vertical moving frame support unit by said vertical moving frame helical elastic member.

15. The two-dimensional moving apparatus according to claim 8, wherein said piezoelectric oscillator has a symmetrical shape in the first direction and the second direction; and an arrangement of said first and second friction members in said second direction and an arrangement of said third and fourth friction members in said first direction are symmetrically centered on said piezoelectric oscillator.

* * * * *